(12) United States Patent
Gschwind

(10) Patent No.: US 9,244,854 B2
(45) Date of Patent: *Jan. 26, 2016

(54) TRANSPARENT CODE PATCHING INCLUDING UPDATING OF ADDRESS TRANSLATION STRUCTURES

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,465

(22) Filed: Sep. 12, 2014

(65) Prior Publication Data

US 2015/0278106 A1 Oct. 1, 2015

Related U.S. Application Data

(63) Continuation of application No. 14/231,635, filed on Mar. 31, 2014.

(51) Int. Cl.
G06F 11/10 (2006.01)
G06F 12/10 (2006.01)
G06F 9/45 (2006.01)

(52) U.S. Cl.
CPC ........ *G06F 12/10* (2013.01); *G06F 8/40* (2013.01); *G06F 2212/65* (2013.01)

(58) Field of Classification Search
CPC ................................................. G06F 11/1016
USPC .......... 714/768, 801, 47, 38.13; 717/152, 141
See application file for complete search history.

(56) References Cited

U.S. PATENT DOCUMENTS 5,551,013 A 8/1996 Beausoleil et al.
5,574,873 A 11/1996 Davidian
(Continued)

FOREIGN PATENT DOCUMENTS

WO WO2013048468 A1 4/2013
WO WO2013101139 A1 7/2013

OTHER PUBLICATIONS

"MMU/SLB/TLB/ERAT"; http://seniordesign,engr.uidaho.edu/2008-2009/hot-threads/docs/TajResearch.docx, pp. 1-7, downloaded from internet Feb. 26, 2014 (no additional date information available).
(Continued)

*Primary Examiner* — Fritz Alphonse
(74) *Attorney, Agent, or Firm* — Steven L. Bennett, Esq.; Blanche E. Schiller, Esq.; Heslin Rothenberg Farley & Mesiti P.C.

(57) ABSTRACT

Code to be modified is identified and modified by a dynamic code optimizer (DCO) or other optimizer executing in the same or different address space as the application being modified. The modified code is stored in memory regions separate from the memory regions of the unmodified or pre-existing code. This allows instruction fetches by the application to access the modified code, while data accesses by the application access the unmodified code. An optimizer may also access the code, but accesses by the optimizer are considered data accesses, and therefore, such accesses would be to the unmodified code, instead of the modified code. Thus, an address mapping capability is provided in which the optimizer may access the modified code by having multiple addresses point to the same physical memory location. One address is used by the application in an instruction fetch and the other address is used by the optimizer in a data access to access the modified code.

10 Claims, 33 Drawing Sheets

(56) References Cited

U.S. PATENT DOCUMENTS

| | | | |
|---|---|---|---|
| 5,682,495 | A | 10/1997 | Beavers et al. |
| 5,790,825 | A | 8/1998 | Traut |
| 5,915,114 | A * | 6/1999 | McKee et al. ............... 717/128 |
| 6,009,261 | A | 12/1999 | Scalzi et al. |
| 6,308,255 | B1 | 10/2001 | Gorishek, IV et al. |
| 6,463,582 | B1 | 10/2002 | Lethin et al. |
| 7,146,607 | B2 | 12/2006 | Nair et al. |
| 7,159,095 | B2 | 1/2007 | Dale et al. |
| 7,251,811 | B2 | 7/2007 | Rosner et al. |
| 7,257,806 | B1 * | 8/2007 | Chen et al. ............... 717/141 |
| 7,284,112 | B2 | 10/2007 | Bradford et al. |
| 7,318,222 | B2 * | 1/2008 | Civlin ............... 717/151 |
| 7,376,807 | B2 | 5/2008 | Moyer |
| 7,487,330 | B2 | 2/2009 | Altman et al. |
| 7,610,580 | B2 * | 10/2009 | Lagergren ............... 717/153 |
| 7,721,274 | B1 * | 5/2010 | Panchenko et al. ........... 717/153 |
| 8,255,880 | B2 | 8/2012 | DeWitt, Jr. et al. |
| 8,479,195 | B2 | 7/2013 | Adams et al. |
| 2007/0079294 | A1 | 4/2007 | Knight et al. |
| 2009/0172713 | A1 | 7/2009 | Kim et al. |
| 2010/0153776 | A1 | 6/2010 | Vick et al. |
| 2012/0144167 | A1 | 6/2012 | Yates, Jr. et al. |
| 2012/0198427 | A1 | 8/2012 | Schmidt |
| 2012/0255015 | A1 | 10/2012 | Sahita et al. |

OTHER PUBLICATIONS

"z/Architecture—Principles of Operation," IBM Publication No. SA22-7832-09, $10^{th}$ Edition, Sep. 2012, pp. 1-1568.

Gschwind, M., E.R. Altman, "Precise Exception Semantics in Dynamic Compilation," 2002 Symposium on Compiler Construction (CC 2002), Grenoble, France, Apr. 2002, 15 pages.

Hutchinson, Luke, "Memory Address Translation," http://www.altdevblogaday.com/2011/07/24/memory-address-translation/, downloaded from internet Mar. 6, 2014, pp. 1-8.

Intel Itanium Architecture Software Developer's Manual vol. 2: System Architecture, Document No. 245318-005, Jan. 2006, pp. 1-654.

Mell, Peter and Tim Grance, "The NIST Definition of Cloud Computing," National Institute of Standards and Technology, Information Technology Laboratory, Version 15, Oct. 7, 2009, pp. 1-2.

Pagiamtzis, K. and A. Sheikholeslami, "Content-addressable memory (CAM) circuits and architectures: A tutorial and survey," IEEE Journal of Solid-State Circuits, vol. 41, No. 3, pp. 712-727, Mar. 2006.

Power ISA™ Version 2.07, May 3, 2013, pp. 1-1526.

Gschwind, Michael K., "Transparent Code Patching Including Updating of Address Translation Structures," U.S. Appl. No. 14/231,635, filed Mar. 31, 2014, 117 pages.

Notice of Allowance for U.S. Appl. No. 14/231,635 dated Oct. 8, 2015, pp. 1-11.

* cited by examiner

TRANSPARENT CODE PATCHING INCLUDING UPDATING OF ADDRESS TRANSLATION STRUCTURES

CROSS-REFERENCE TO RELATED APPLICATIONS

This application is a continuation of co-pending U.S. patent application Ser. No. 14/231,635, filed Mar. 31, 2014, entitled "TRANSPARENT CODE PATCHING INCLUDING UPDATING OF ADDRESS TRANSLATION STRUCTURES," which is hereby incorporated herein by reference in its entirety.

BACKGROUND

One or more aspects relate, in general, to processing within a computing environment, and in particular, to facilitating such processing.

Opportunities to improve the operation of computer systems are provided by a number of code rewriting techniques. For example, code rewriting may be used to modify binaries to avoid known hardware errors. In other examples, existing code may be modified to improve performance by re-optimizing hot regions, either from binary code, or from additional internal representation formats stored by the static compiler that allow code to be re-optimized without decompiling the binary code.

Various offline optimizers have been used to rewrite code. These optimizers modify the actual binary, making self-referential programs, including those that compute checksums of their own code to validate correctness, fail. These offline optimizers also depend on obtaining workload statistics.

Other optimization techniques, such as dynamic code optimization, also rewrite code. These techniques, however, recompile code dynamically and store the newly generated code in its entirety in locations different from the original code to preserve such self-referential behavior.

SUMMARY

Shortcomings of the prior art are overcome and advantages are provided through the provision of a method of facilitating processing within a computing environment. The method includes, for instance, obtaining, by a processor, an address translation mapping, wherein the address translation mapping includes: a first address to be translated to a second address, the first address being of a first type and the second address being of a second type, the second address of the second type indicating a memory location that includes modified code of an application, the modified code accessible via an instruction fetch of the application; the first address to be translated to a third address, the third address being of the second type and indicating a memory location that includes unmodified code corresponding to the modified code, the unmodified code accessible via data accesses of the application; and a fourth address to be translated to the second address, the fourth address being of the first type, and wherein the modified code located at the memory location indicated by the second address is accessible via a data access by a component different from the application; and accessing the memory location indicated by the second address by at least one of the application using an instruction fetch or the component using a data access, the accessing including using the address translation mapping.

Computer program products and systems relating to one or more embodiments are also described and may be claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

Figure 1:
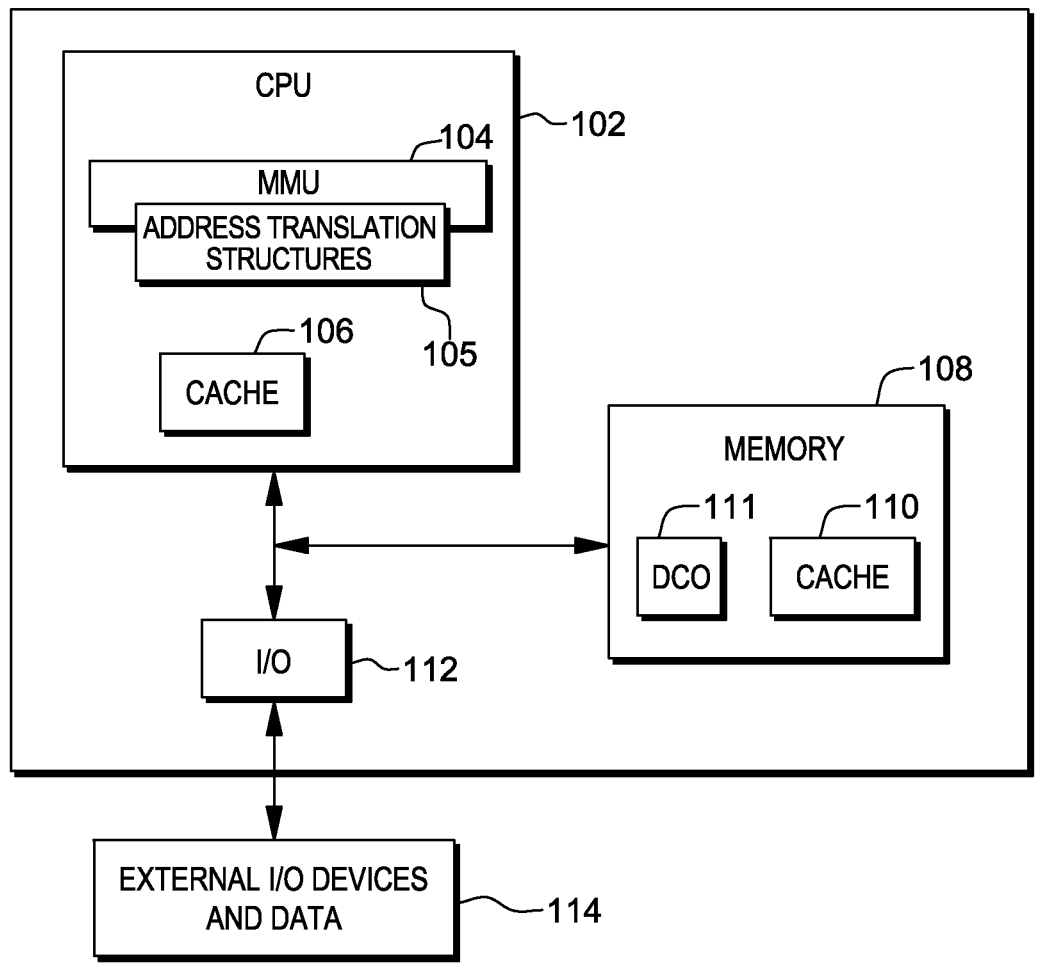
FIG. 1 depicts one example of a computing environment to incorporate and use one or more aspects of a transparent code patching capability.

In accordance with one or more aspects, a capability is provided to transparently patch code while maintaining correct execution in, for instance, the presence of self-referential behavior, i.e., preserving the appearance that the code has not been modified. In one example, one or more portions of application code are modified (e.g., changed, revised, enhanced, updated, optimized, etc.), and therefore, the application code is considered patched (i.e., existing code is used along with the modifications). A portion of the code to be modified is copied, modified, and stored in one or more memory regions (e.g., pages of memory) that are separate from the memory regions storing the pre-existing or unmodified application code.

When code is patched, in accordance with one or more aspects, separate address translation is provided, which depends, for instance, on whether the translation is for an instruction fetch or a data access. For instance, data accesses (e.g., address translation for data accesses) are directed to the unmodified code (i.e., one or more first memory regions), while code translation (e.g., address translation for instruction fetches) is directed to the modified code (i.e., one or more second memory regions). Additionally, instruction fetches and data accesses for code of the application that has not been copied are directed to the same pre-existing code, which are also stored in the one or more first memory regions, in this example. This separate address translation is accomplished by, for instance, hardware support that selectively manages separate instruction and data translation within a processor, enabling only portions (e.g., modified portions) of the code to be duplicated rather than the entire code.

In one aspect, the code to be modified is identified and modified by a dynamic code optimizer (DCO) or other optimizer executing in the same or different address space than the application being modified. The modified code, as described herein, is stored in separate memory regions (e.g., one or more second memory regions) than the unmodified or pre-existing code. This allows instruction fetches by the application to access the modified code, while data accesses access the unmodified code. However, in one embodiment, any access by the optimizer would be considered a data access, and therefore, such access would be to the unmodified code, instead of the modified code. Thus, in accordance with one aspect, an address mapping capability is provided in which multiple addresses point to the same physical memory location. One address is used by the application in an instruction fetch and the other address is used by the optimizer in a data access.

Computing environments of different architectures may incorporate and use one or more aspects of the transparent code patching capability, including the separate instruction and data address translation provided herein. For instance, environments based on the PowerPC architecture, also referred to as Power ISA, offered by International Business Machines Corporation (IBM®) and described in Power ISA™ Version 2.07, May 3, 2013, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7832-09, 10th Edition, September 2012, which is hereby incorporated by reference herein in its entirety.

POWER, POWER ARCHITECTURE, POWERPC, Z/ARCHITECTURE, IBM, AIX, POWERVM, Z/OS and Z/VM (referenced herein) are registered trademarks of International Business Machines Corporation, Armonk, N.Y. Other names used herein may be registered trademarks, trademarks or product names of International Business Machines Corporation or other companies.

One example of a computing environment to incorporate and use one or more aspects of the transparent code patching capability, including separate instruction and data address translation, is described with reference to FIG. 1. In one example, a computing environment 100 includes a processor (central processing unit—CPU) 102 that includes at least one memory management unit (MMU) 104, one or more address translation structures 105, and one or more caches 106. Processor 102 is communicatively coupled to a memory portion 108 and to an input/output (I/O) subsystem 112. Memory portion 108 includes, for instance, one or more caches 110 and optionally, a dynamic code optimizer (DCO) 111, which may be used to optimize applications executing within the processor. I/O subsystem 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes one or more address translation structures 105 including, for instance, a translation lookaside buffer (TLB) and a segment lookaside buffer (SLB) which, in one embodiment, are located in the MMU. The TLB is a cache of previously translated addresses. Thus, when a request is received for a memory access that includes an address to be translated, the TLB is checked first. If the address and its translation are in the TLB, then no further translation process based on using any number of translation techniques is necessary. Otherwise, the received address is translated using one of any number of translation techniques.

Figure 2:
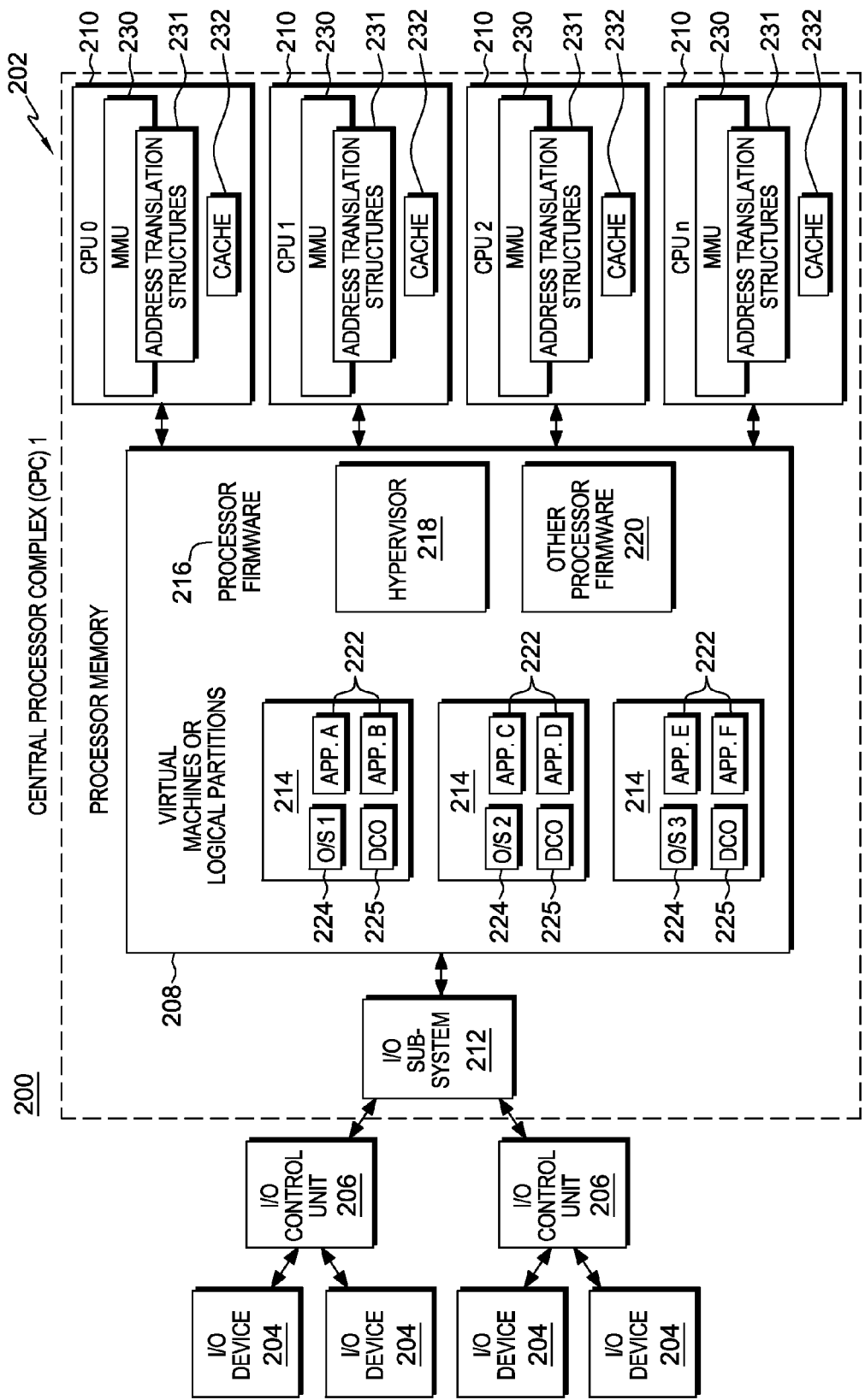
FIG. 2 depicts another example of a computing environment to incorporate and use one or more aspects of a transparent code patching capability.

A further embodiment of a computing environment to incorporate and use one or more aspects of the transparent code patching capability, including separate instruction and data address translation, is depicted in FIG. 2. Referring to FIG. 2, in one example, a computing environment 200 includes a central processor complex (CPC) 202 coupled to one or more input/output (I/O) devices 204 via one or more control units 206. Central processor complex 202 includes processor memory 208 (a.k.a., main memory, main storage, central storage) coupled to one or more central processors (a.k.a., central processing units (CPUs)) 210 and an I/O subsystem 212, each of which is further described below.

Processor memory 208 includes one or more virtual machines 214 (for one example of the PowerPC architecture) or one or more logical partitions 214 (for one example of the z/Architecture), and processor firmware 216, which includes a hypervisor 218 and other processor firmware 220. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the z/VM operating system, the z/OS operating system, the z/Linux operating system, the TPF operating system, the AIX operating system, the Power Linux operating system, the IBM i/OS operating system, or another operating system, offered by International Business Machines Corporation, Armonk, N.Y., or another operating system offered by another company. Further, each logical partition or virtual machine may include a dynamic code optimizer 225 or other optimizer that may execute as part of the operating system, part of one or more applications or on its own to provide optimized application code.

The virtual machines are managed by hypervisor 218, such as PowerVM, offered by International Business Machines Corporation, Armonk, N.Y.; and the logical partitions are managed by hypervisor 218, such as the Processor Resource/System Manager (PR/SM), offered by International Business Machines Corporation, Armonk, N.Y.

Central processors 210 are physical processor resources assignable to the virtual machines or allocated to the logical partitions. For instance, each virtual machine or logical partition 214 includes one or more logical processors, each of which represents all or a share of a physical processor 210 that may be dynamically allocated to the virtual machine or partition. A central processor may include a memory management unit (MMU) 230 and one or more address translation structures 231 providing address translation, as described herein, and at least one cache 232.

Input/output subsystem 212 directs the flow of information between input/output devices 204 and main memory 208. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. Further, the I/O subsystem uses one or more input/output paths as communication links in managing the flow of information to or from input/output devices 204.

Figure 3A:
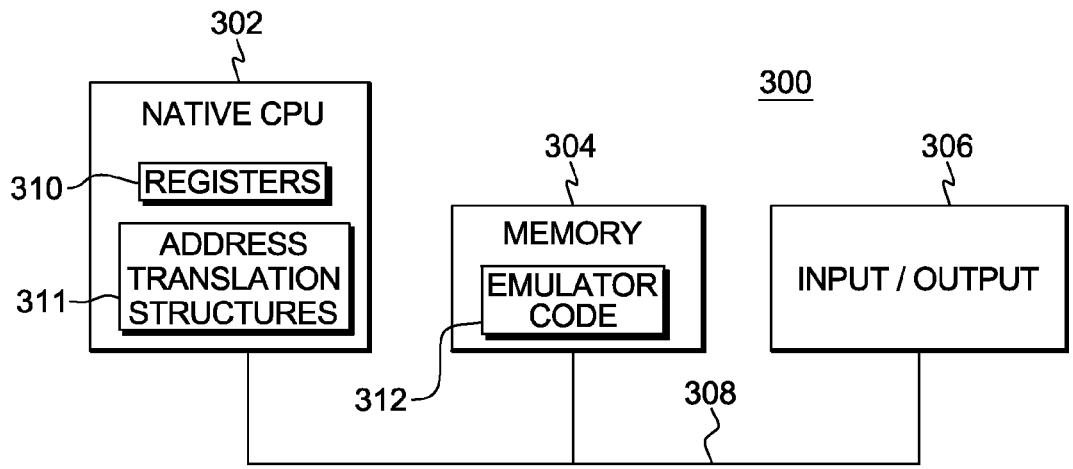
FIG. 3A depicts yet another example of a computing environment to incorporate and use one or more aspects of a transparent code patching capability.

Another embodiment of a computing environment to incorporate and use one or more aspects of the transparent code patching capability, including separate instruction and data address translation, is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as one or more address translation structures 311. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture, or allows machines based on architectures other than the Power Architecture, such as HP Superdome servers or others, to emulate the Power Architecture and to execute software and instructions developed based on the Power Architecture.

Figure 3B:
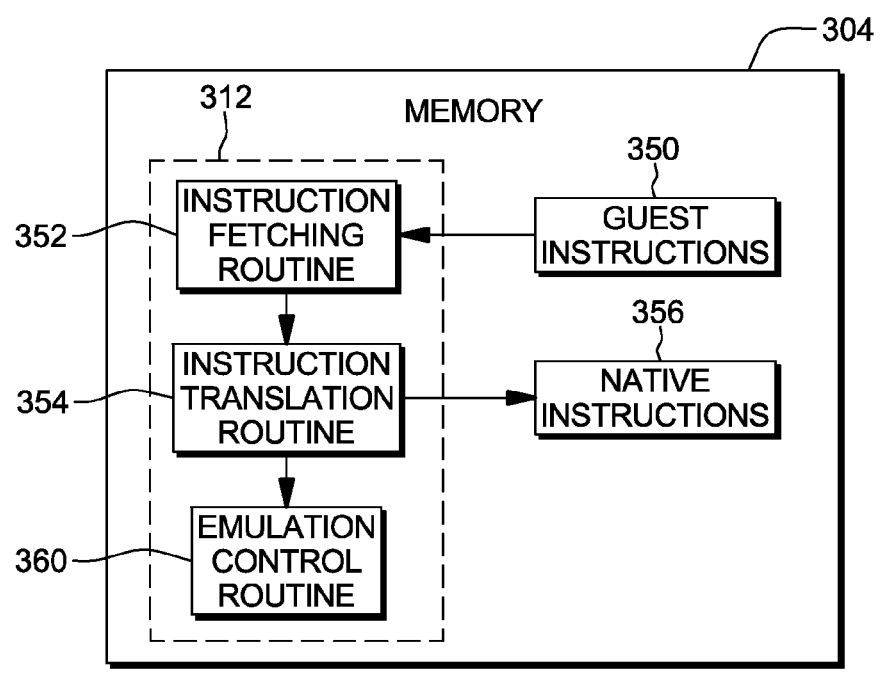
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a Power Architecture or z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Computing environments, such as those described above, are enhanced by including components that alter application programs executing within the environments to provide those application programs with additional features. For instance, a component, referred to as dynamic code optimization (DCO), may be provided that examines programs as they are executing, recognizes frequently executed code segments and optimizes those segments. Other types of optimization are also possible, as well as other types of components. Further, changes may be made to programs for other reasons, such as correcting an error, providing workarounds for known hardware errata, enhancing security, etc.

Changing a program while it is executing is complicated and issues may arise. For instance, if a program references itself, i.e., it is self-referential, it may detect the change and refuse to run or the change may cause it to run improperly due to it being self-referential. An example of a self-referential code may be a binary that validates its own correctness by computing the checksum of its program code, and comparing the computed result with an expected result to avoid tampering. Thus, in accordance with one aspect, a capability is provided that allows applications to be modified, while preserving self-referential integrity.

In one example, for dynamic code optimization, code that is not frequently used is maintained unchanged, and code that is frequently used, referred to as hot spots, are dynamically compiled into optimized code and the pre-existing code is patched to integrate the optimized code into the pre-existing code generating patched code. Then, to transfer to the optimized code, the original binary is modified (patched) by inserting a jump instruction to jump to the optimized code and when done, another jump instruction is inserted to jump back to the original code.

Figure 4:
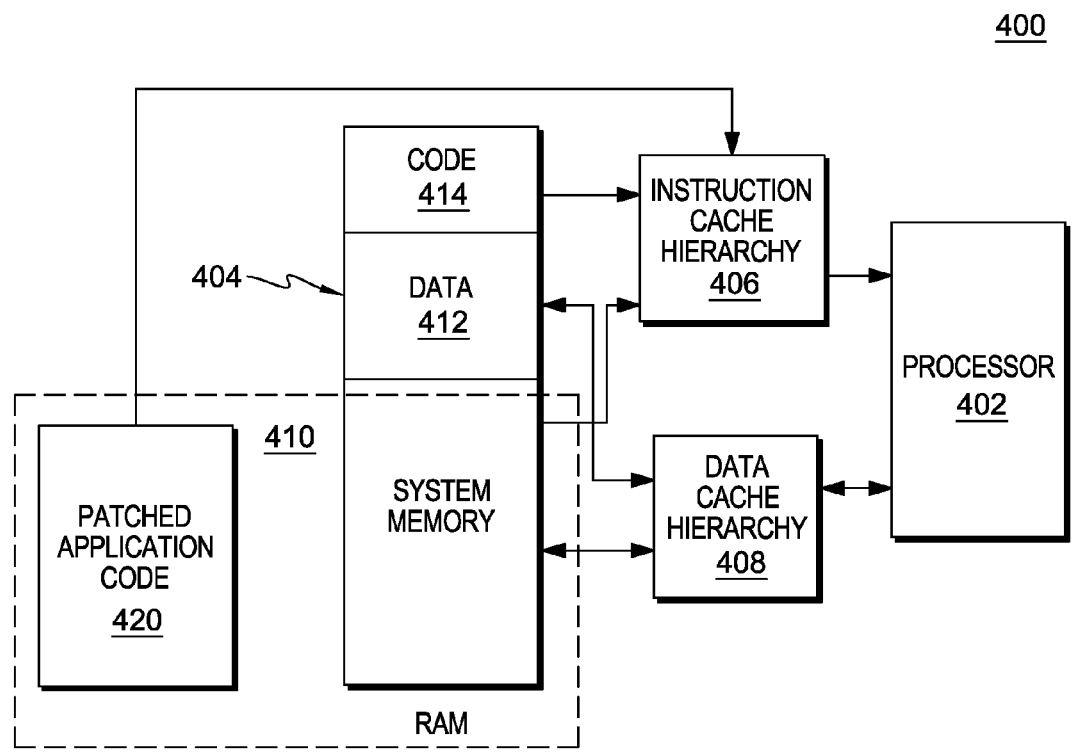
FIG. 4 depicts one example of a computing environment including patched application code.

One example of a computing environment that includes patched code is depicted in FIG. 4. This computing environment is based, for instance, on the PowerPC architecture offered by International Business Machines Corporation, however many other systems may incorporate and use one or more of the aspects described herein. As shown, a computing environment 400 includes, for instance, a processor 402 coupled to a memory 404 via one or more caches 406, 408. Memory 404 is, for instance, random access memory, having a plurality of portions, including, for example, system memory 410, data memory 412, and code memory 414 (also referred to as instruction memory). In one example, system memory 410 includes application code, including, for instance, patched application code 420, and/or data for one or more applications; data memory 412 is memory used by, for instance, an optimizer; and code memory 414 is, for instance, code of the optimizer. Code memory 414 is coupled to instruction cache 406 accessed by processor 402; and data memory 412 and system memory 410 are coupled to data cache 408 accessed by processor 402. Further, system memory 410, including patched application code 420, is also coupled to instruction cache 406.

In particular, in one embodiment, system memory 410 includes, for instance, application code for one or more applications, including patched application code 420. For example, application code for a particular application is stored in one or more memory regions (e.g., pages) of system memory 410. If the particular application is modified, then it is referred to as patched application code, which includes the existing code plus the modified code. From a memory viewpoint, the portions of the patched application code that have not been modified continue to be stored in the same memory regions as the pre-existing application code, and any duplicated or modified code is stored in one or more memory regions of system memory 410 separate from the memory regions of the pre-existing or unmodified application code. This, in conjunction with support for address translation of memory addresses as a function of access attributes, e.g., using separate instruction/data translation, allows the view of memory from the instruction fetcher to be fenced off, enabling the use of patched code while maintaining referential integrity.

As described herein, since the patched application code includes modified code located in one or more separate memory regions and this modified code is to be hidden from data accesses, separate address translations for instruction fetches and data accesses relating to the modified code are provided, as described below.

Figure 5:
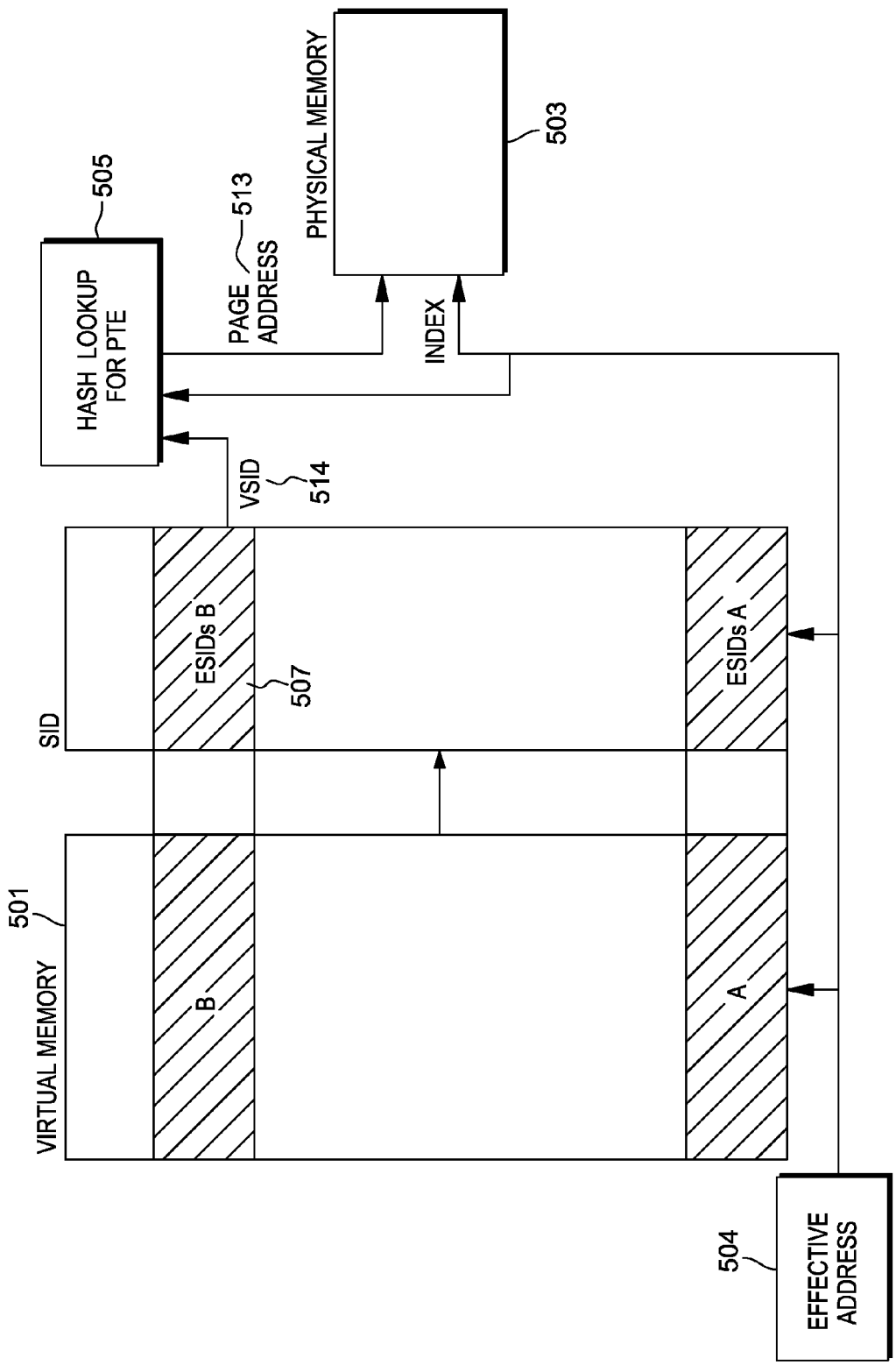
FIG. 5 illustrates an example of a high-level view of a virtual memory mapped to a physical memory using a hash page table technique.

Details regarding physical memory used by one or more of the computing environments described herein and access thereto are described with reference to FIG. 5. As is known, physical memory is of a defined size and in order to have the physical memory appear larger than it is, virtual memory is utilized. One example of a high-level view of virtual memory 501 mapped to a physical memory 503 (such as memory 108, 208, 304, 404 or a portion thereof) is depicted in FIG. 5. In this example, the mapping from virtual memory to real memory is via a hash page table (HPT) technique 505 to locate page table entries (PTEs), as used by, for example, Power ISA. In this example, programs only use sections (or segments) A and B of the virtual memory. Each segment of the virtual memory is mapped to a segment identifier (SID) entry 507 identified by an effective segment ID (ESID) (ESIDs for B and ESIDs for A included). An "effective address" 504 used by the program selects an SID entry, which includes the ESID value, as well as a virtual segment ID (VSID) 514 value. The VSID value represents the high-order bits of a virtual address to be used by hashing algorithm 505 to search the hash page table. A hashed value based on the VSID is used to locate a page table entry (PTE). The page table entry includes an address 513 of a page of physical memory 503.

Figure 6:
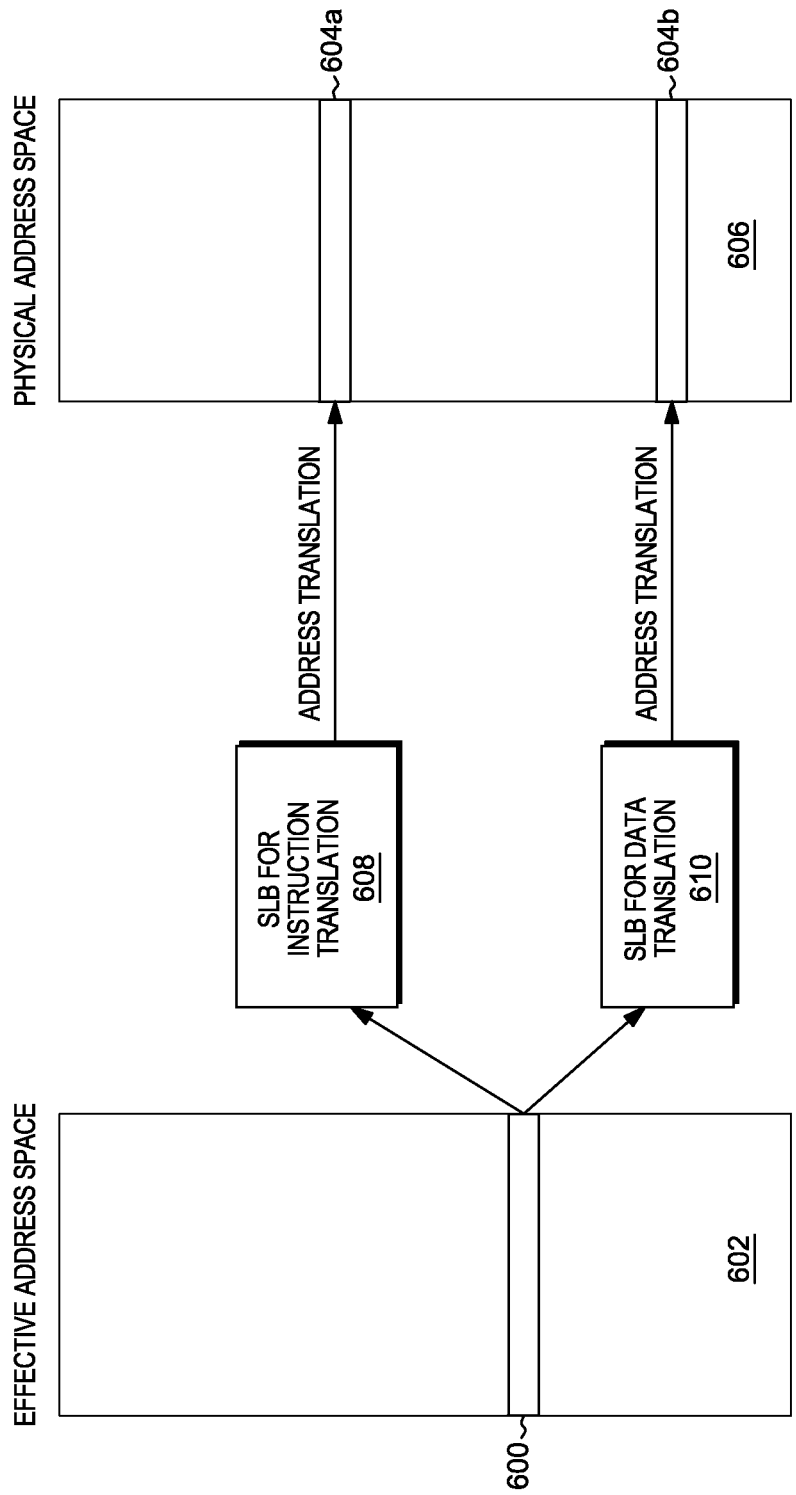
FIG. 6 depicts one example in which one effective address is able to be translated to different physical addresses.

As indicated above, an effective address is used to obtain a physical address in order to access a particular memory location. In accordance with one aspect, as depicted in FIG. 6, one effective address 600 in an effective address space 602 may translate to multiple physical addresses 604a, 604b of a physical address space 606 depending on whether the translation is for an instruction translation 608 or a data translation 610. In particular, in one embodiment, separate address translation (i.e., separate instruction and data translation) may be used in certain situations, such as for instance, when code has been modified, but the modified code is to be hidden from data accesses. In such a situation, the modified code is placed in a separate memory region at a different physical address than the unmodified code, and the physical address of the separate memory region is determined via address translation for instruction fetches. The unmodified code, however, is still accessed by data accesses, which use address translations for data accesses that point to another physical address (i.e., of the unmodified code). This allows, for instance, the view of memory the instruction fetcher sees to be fenced off from the view of the data accesses. For those situations, where the code is unchanged, address translation for instruction fetches and data accesses point to the same physical memory locations. These locations are referred to as being shared for instruction fetches and data accesses.

In accordance with one aspect, an address translation capability is described in which the address translation takes into consideration whether the memory access is for an instruction fetch or a data access. One embodiment of address translation is described with reference to FIGS. 7-10. The particular example described herein is for the PowerPC architecture; however, aspects of the address translation capability are not limited to such an architecture.

Figure 7:
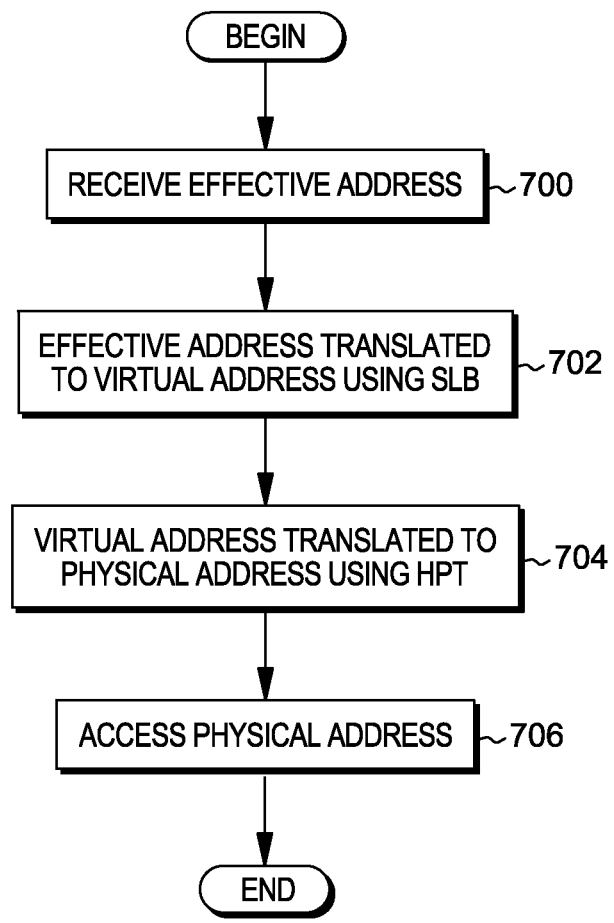
FIG. 7 depicts one embodiment of an address translation process.

Initially, referring to FIG. 7, a memory management unit (MMU) of a processor receives an effective address to be translated, STEP 700. The effective address is, for instance, a 64-bit address that may be received in an address translation request from the processor. As examples, the request may be from an instruction fetch unit of the processor, and therefore, the address to be translated is assumed to be for an instruction fetch, or the request may be from a load/store unit of the processor, and therefore, the address to be translated is assumed to be for a data access. In other embodiments, an indication in the request indicates whether the address translation is for an instruction fetch or a data access. The MMU translates the effective address to a virtual address, STEP 702. In one example, the translation from the effective address to the virtual address uses a segment lookaside buffer (SLB), as described further below. The MMU then translates the virtual address to a physical address, STEP 704. In one particular example, the translation from the virtual address to the physical address uses a hash page table, again as described further below. The MMU then uses the physical address to access the particular memory location, STEP 706.

Figure 8:
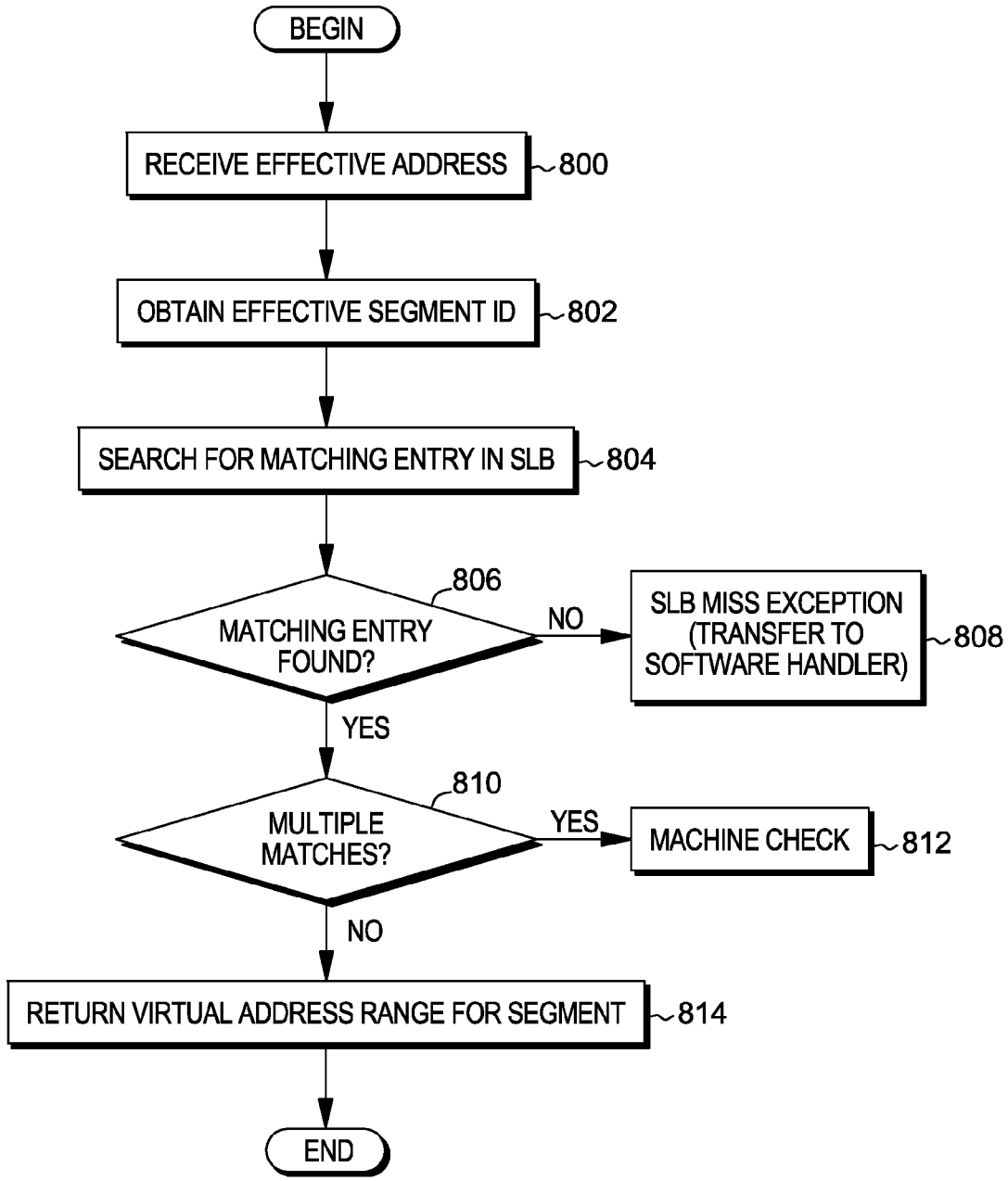
FIG. 8 depicts one embodiment of logic to translate an effective address to a virtual address.

Further details regarding translating from the effective address to the virtual address, by, for instance, the MMU are described with reference to FIGS. 8 and 9. Referring initially to FIG. 8, the MMU receives an effective address via, for instance, an address translation request sent from a particular unit (e.g., instruction fetch, load/store unit) of the CPU, STEP 800. Based on receiving the effective address, the MMU determines whether the address is for an instruction fetch or a data access. This can be determined, in one example, based on which unit (e.g., fetch unit or load/store unit of the CPU) the MMU received the address translation request or by an indicator associated with the request, as examples. For instance, if the address translation request came from the fetch unit, then it is assumed that the request is for an instruction fetch, and if it came from the load/store unit, it is assumed it is for a data access. Based on receiving the effective address, the MMU obtains an effective segment identifier from the effective address, STEP 802. The MMU then uses the effective segment identifier to search a segment lookaside buffer for a matching entry, STEP 804.

Figure 9:
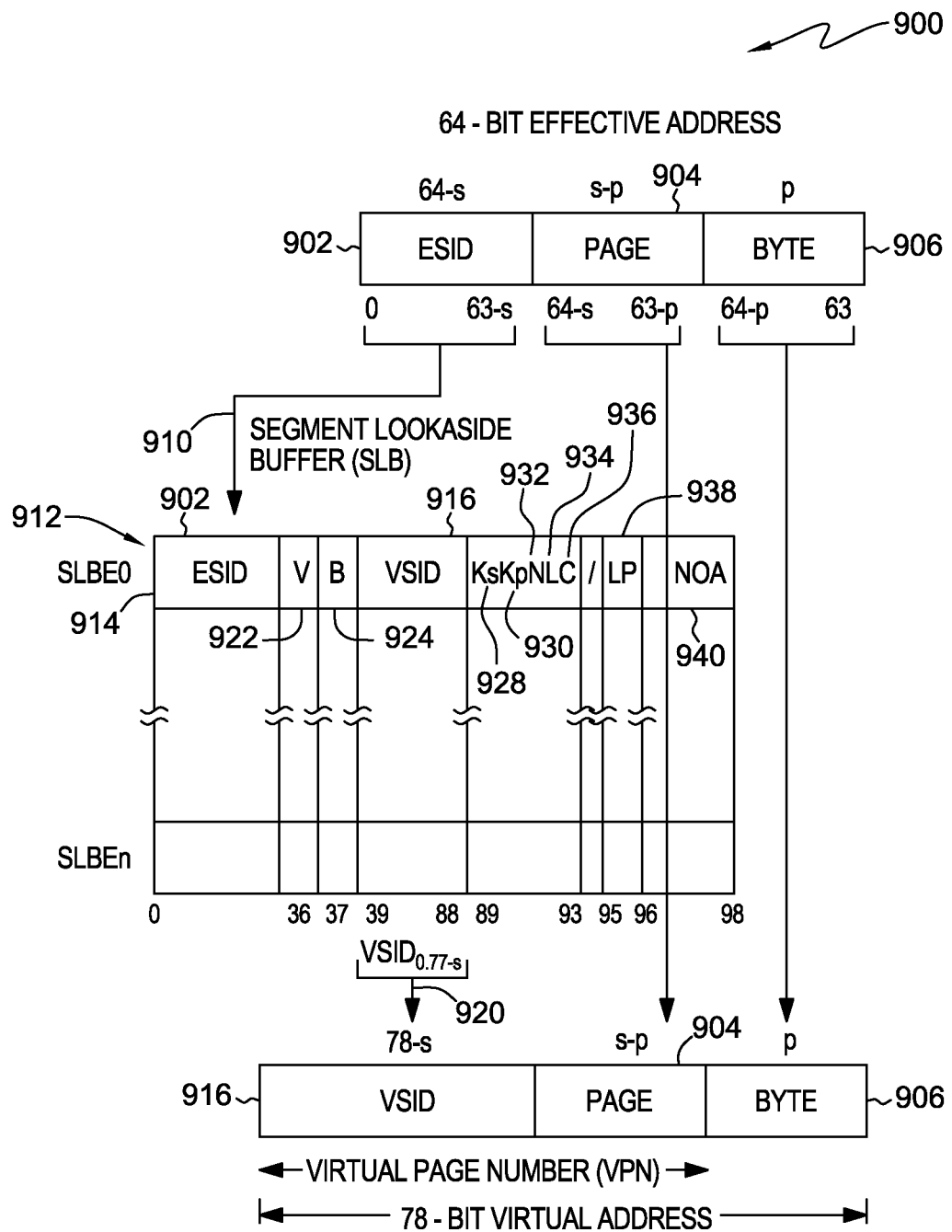
FIG. 9 pictorially depicts one embodiment of translating an effective address to a virtual address.

In particular, as shown in FIG. 9, in one embodiment, an effective address 900 is a 64-bit address including an effective segment identifier (ESID) 902, a page offset 904, and a byte offset 906. The effective segment identifier is extracted 910 from the effective address and used to search a segment lookaside buffer (SLB) 912 for a matching entry 914. A segment lookaside buffer (SLB) 912 is a cache of recently accessed segment ID entries. In one example, it is located in the MMU, but in other examples, it is located elsewhere. It specifies the mapping between effective segment IDs (ESIDs) and virtual segment IDs (VSIDs). The number of SLB entries (SLBE) in an SLB is implementation dependent, and in one example, includes at least 32 entries. In one example, segment lookaside buffer 912 includes a plurality of SLB entries 914, and each SLB entry 914 maps one ESID 902 to one VSID 916. In one example, SLBE 914 includes the following fields:

Effective segment ID (ESID) 902 (bits 0-35);
Entry valid indicator (V) 922 (bit 36) which indicates whether the entry is valid (V=1) or invalid (V=0);
Segment size selector (B) 924 (bits 37-38), which has the following meaning, in one example: 0b00-256 Megabytes (MB) (s=28); 0b01-1 Terabyte (TB) (s=40); 0b10-256 TB (s=48); and 0b11-reserved;
Virtual segment ID (VSID) 916 (bits 39-88);
Supervisor (privileged) state storage key indicator ($K_s$) 928 (bit 89);
Problem state storage key indicator ($K_p$) 930 (bit 90);
No-execute segment if N=1 indicator (N) 932 (bit 91). Instructions cannot be executed from a No-execute (N=1) segment;
Virtual page size selector bit 0 (L) 934 (bit 92);
Class indicator (C) 936 (bit 93);
The Class field of the SLBE is used in conjunction with, for instance, slbie (SLB invalidate entry) and slbia (SLB invalidate all) instructions. "Class" refers to a grouping of SLB entries and implementation-specific lookaside information so that only entries in a certain group need be invalidated and others might be preserved. The Class value assigned to an implementation-specific lookaside entry derived from the SLB entry is to match the Class value of that SLB entry. The Class value assigned to an implementation-specific lookaside entry that is not derived from an SLB entry (such as real mode address "translations") is 0.
Virtual page size selector bits 1:2 (LP) 938 (bits 95-96);
Segments may contain a mixture of page sizes. The L and LP bits specify the base virtual page size that the segment may contain. The $SLB_{L\|LP}$ encoding are those shown below, in one example. The base virtual page size (also referred to as the "base page size") is the smallest virtual page size for the segment. The base virtual page size is $2^b$ bytes. The actual virtual page size (also referred to as the "actual page size" or "virtual page size") is specified by $PTE_{L\|LP}$, where $\|$ is a concatenation of the two values.

| Encoding | Page Size |
| --- | --- |
| 0b000 | 4 KB |
| 0b101 | 64 KB |
| additional values[1] | $2^b$ bytes, where b > 12 and b may differ among encoding values |

[1]In one embodiment, the "additional values" are implementation-dependent, as are the corresponding base virtual page sizes. Any values that are not supported by a given implementation are reserved in that implementation, in at least one embodiment.

No Access (NOA) indicator 940 (bits 97:98), which $NOA_0$=No Instruction (NOI); $NOA_1$=No Data (NOD); 0b00—SLBE can be used for both instruction fetches and data accesses; 0b01—SLBE can only be used for instruction fetches; 0b10—SLBE can only be used for data accesses; and 0b11—reserved.

For each SLB entry, software is to ensure the following requirements are satisfied.
L\|LP contains a value supported by the implementation.
The base virtual page size selected by the L and LP fields does not exceed the segment size selected by the B field.
If s=40, the following bits of the SLB entry contain 0s.
$ESID_{24:35}$
$VSID_{39:49}$
The bits in the above two items are ignored by the processor.

In accordance with one aspect, the NOA field specifies for each SLB entry whether the SLB entry is to be used to translate an effective memory address to a virtual address for instruction fetch and data access (NOA=0b00, in one encoding of allowed accesses for a segment in accordance with one aspect), for data accesses but not instruction fetch (NOA=0b10, in one encoding of allowed accesses for a segment in accordance with one aspect), and for instruction fetch but not data access (NOA=0b01, in one encoding of allowed accesses for a segment in accordance with one aspect).

It is legal to have multiple effective to virtual segment id translations, as long as only one is selected to be performed based on the NOA bits. To accomplish this, software is to ensure that the SLB contains at most one entry that translates a given instruction effective address, and that if the SLB contains an entry that translates a given instruction effective address ($NOA_0=0$), then no other entry can translate the same address for instruction fetches. In accordance with one aspect, when installing a new SLB entry for one or more access modes (e.g., instruction fetch), software is to ensure that any previously existing SLB translation entry of that effective address that may translate an address for such access mode has been invalidated. Likewise, software is to ensure that the SLB contains at most one entry that translates a given data effective address ($NOA_1=0$), and that if the SLB contains an entry that translates a given data effective address, then any previously existing translation of that effective address for data accesses has been invalidated. An attempt to create an SLB entry that violates these requirements may cause a machine check. In accordance with one embodiment, a machine check is a high priority interrupt to a firmware, hypervisor or other supervisor component to indicate that system integrity constraints have been violated.

In accordance with one embodiment, it is permissible for software to replace the contents of a valid SLB entry without invalidating the translation specified by that entry provided the specified restrictions are followed.

When the hardware searches the SLB, all entries are tested for a match with the effective address (EA). For a match to exist, the following conditions are to be satisfied for indicated fields in the SLBE.

V=1 (i.e., the valid bit is set for an entry)

$ESID_{0:63-s}=EA_{0:63-s}$, where the value of s is specified by the B field in the SLBE being tested.

The search is an instruction address search and NOI=0, or the search is a data address search and NOD=0.

In particular, in one embodiment, an entry in the SLB is matching if the entry is valid, has an effective segment identifier matching the obtained effective segment identifier from the effective address, and the No Access (NOA) SLB field is set for the type of memory access being performed, e.g., for an instruction fetch or a data access. The NOA includes, for instance, two bits, in which a value of 01 indicates an address can be used to match addresses associated with instruction access only; 10 indicates an entry can be used to match addresses associated with data access only; and 00 indicates an entry can be used to match addresses associated with both instruction fetches and data accesses. If the NOA field is set for the requested access and the effective SID is the same as the obtained effective SID, then there is a match.

Returning to FIG. 8, a determination is made as to whether a matching entry in the SLB was found, INQUIRY 806. In particular, the matching logic is performed in conjunction with the NOA field of FIG. 9 indicating the types of accesses each particular SLBE may translate. If no matching entry was found, then there is indicated an SLB miss exception, which transfers control to a software handler for handling the exception, STEP 808. In at least one embodiment, the software handler manages the SLB as a cache and reloads a new SLB entry (SLBE) from a table of SLBEs maintained in memory.

If, however, a matching entry is found, INQUIRY 806, then a determination is made as to whether multiple matching entries were found, INQUIRY 810. If there are multiple matches, a machine check may be taken, STEP 812, since there should not be multiple matches, or in another embodiment, one of the entries is selected and used.

However, if there is one match (or one is selected), a virtual segment identifier (VSID) 916 (FIG. 9) in the SLB entry is extracted 920 and used as part of the virtual address. The VSID is concatenated with page offset 904 and byte offset 906 from the effective address to create the virtual address. This virtual address is then returned, STEP 814 (FIG. 8).

As described above, for the SLB search, if no match is found, the search fails. If one match is found, the search succeeds. If more than one match is found, one of the matching entries may be used as if it were the only matching entry, or a machine check occurs. If the SLB search succeeds, the virtual address (VA) is formed from the EA and the matching SLB entry fields as follows: $VA=VSID_{0:77-s}\|EA_{64-s:63}$. The Virtual Page Number (VPN) is bits $0:77\text{-}p$ of the virtual address. The value of p is the actual virtual page size specified by the PTE used to translate the virtual address. If $SLBE_N=1$, the N (noexecute) value used for the storage access is 1.

On an instruction fetch, if $SLBE_N=1$, an Instruction Storage interrupt may occur without the page table being searched. If the SLB search fails, a segment fault occurs. This is an instruction segment exception or a data segment exception, depending on whether the effective address is for an instruction fetch or for a data access.

The virtual address created from translation of the effective address is then translated to a physical address (a.k.a., a real address) using, for instance, a hash page table. Further details regarding translation using a hash page table are described with reference to FIG. 10.

Figure 10:
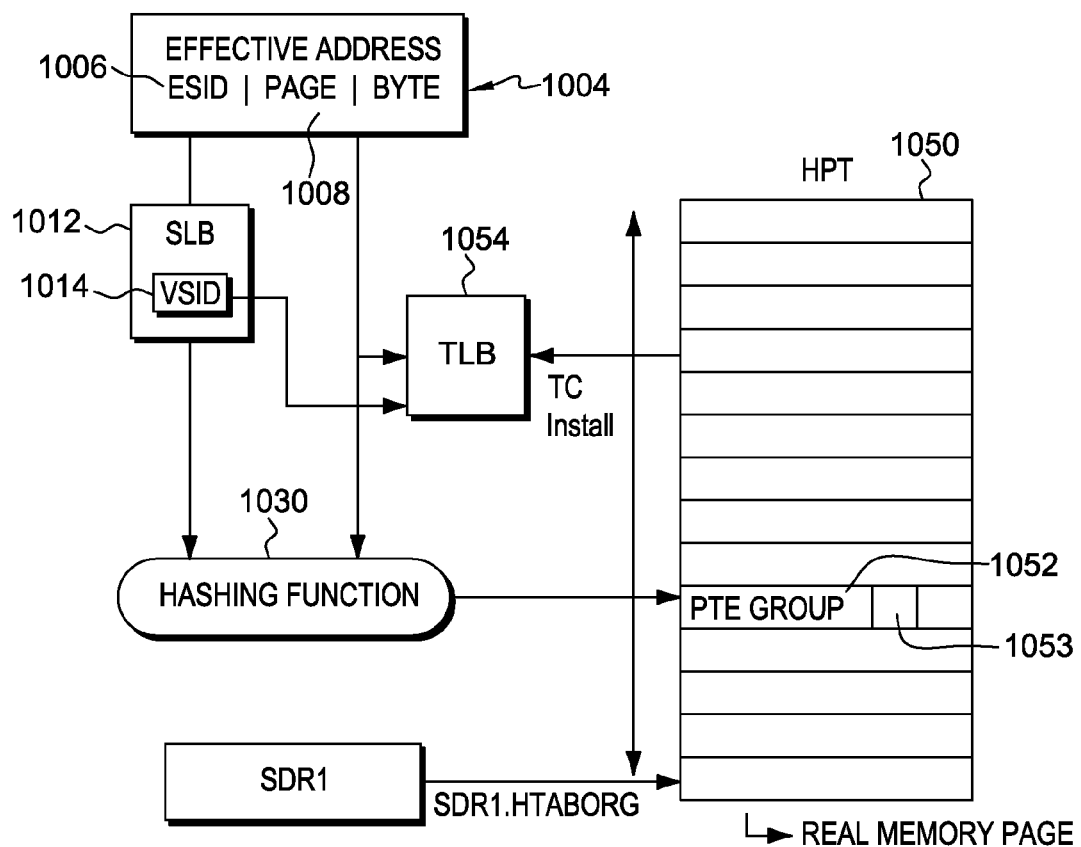
FIG. 10 depicts one example of a hash page table translation structure.

In particular, FIG. 10 illustrates one example of a hash page table (HPT) translation structure used by Power ISA. ESID portion 1006 of an effective address (EA) 1004 is used to locate an entry in SLB 1012. The entry includes a VSID field 1014. The value of VSID field 1014 and the page portion 1008 of EA 1004 are hashed 1030 to produce a hash value that is used to locate a page table entry (PTE) group 1052 in a hash page table (HPT) 1050. (In another embodiment, since the virtual address was previously created, the VSID and page portion may be extracted directly from the formed virtual address.) In at least one embodiment, the hash page table is located by a page table origin address provided by the processor. Page table entries 1053 of PTE group 1052 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 1008 of EA 1004 and the address of the physical memory page found in the PTE are stored in TLB 1054, such that further accesses to the same EA page will "hit" in TLB 1054 and avoid the PTE search.

As described above, in one example, address translation is performed based on a particular attribute, such as, for instance, the type of access: instruction fetch or data access. To enable this, a mechanism is provided that includes a field in the SLB to prevent SLBEs from being used for instruction-side or data-side accesses. This field, as indicated above, is the No Access (NOA) field. The NOA is used to indicate that a particular SLBE associated with the NOA can be used for only instruction fetches, only data accesses, or for both instruction fetches and data accesses (e.g., when the code is not modified).

In accordance with one embodiment, the NOA field is separately specified for each segment in conjunction with an SLB entry, thereby allowing some effective address segments (memory regions of the input address) to be translated to a common segment address for instruction and data accesses (memory regions of the output address), and other segments (memory regions of the input address) to be translated to separate segment addresses for instruction and data accesses (memory regions of the output address), respectively, or to provide a translation for one type of access (e.g., instruction access), but not another type of access (e.g., data access) by loading an appropriate SLB entry for one type of access, but not another. While the description has been made with respect to the presence of a NO Access field, and to a specific encoding of a NO Access field in the SLB, it is understood that other fields, other encodings for such fields, or both, may be used to identify the types of permissible access for a translation.

Figure 11:
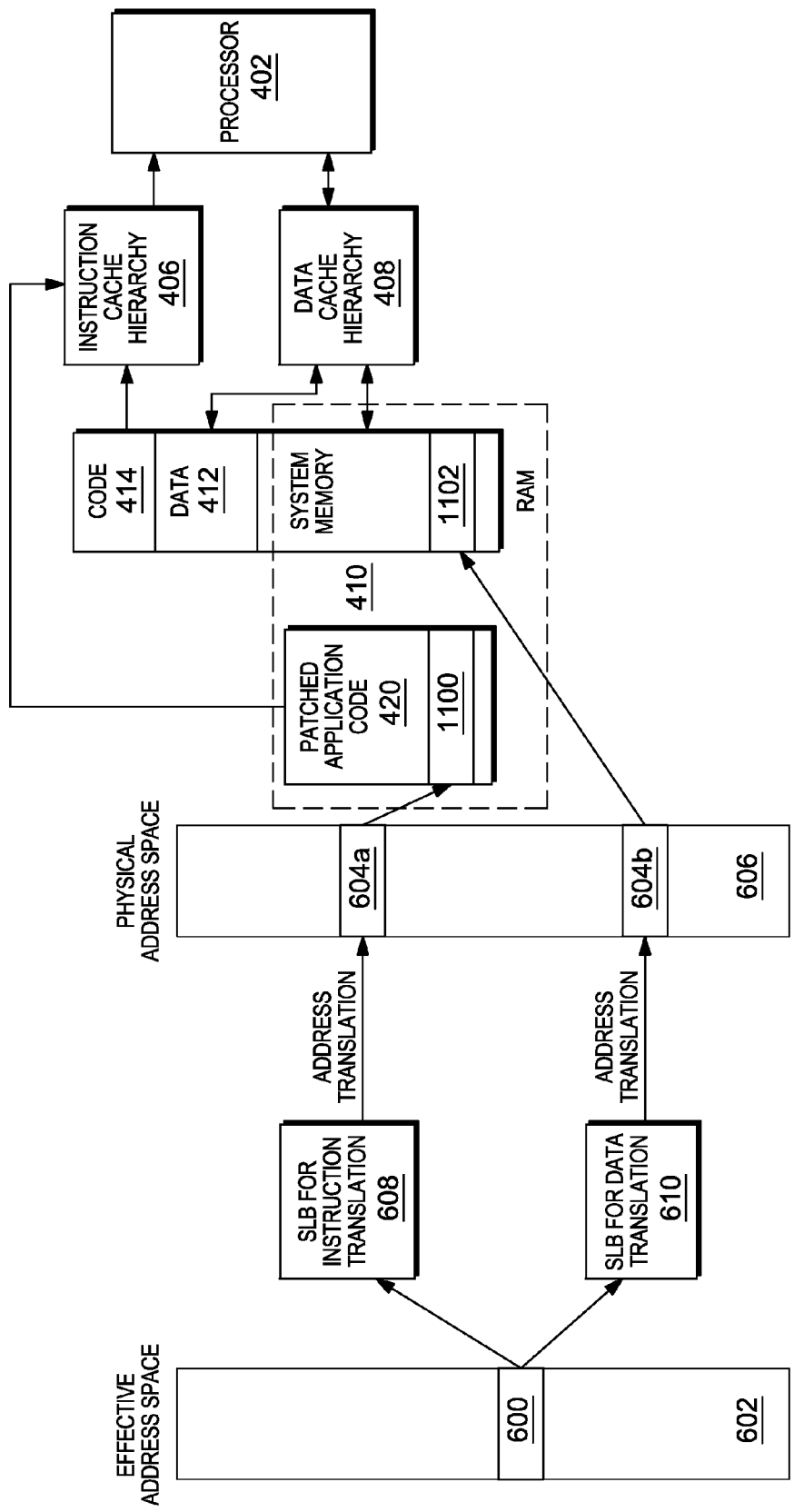
FIG. 11 depicts one example of an effective address being translated to separate physical addresses.

As described herein, in accordance with one or more aspects, the separate instruction/data address translation technique is used to redirect address translation to a particular region of memory that includes modified code for instruction fetches and another region of memory that includes the unmodified code for data accesses, as shown in FIG. 11. In one or more examples, an SLB-based mechanism, as described above, may be used or other types of mechanisms, which are based, for instance on hierarchical or radix address translation structures. In such a mechanism, in one embodiment, an attribute indicator is provided in an entry of one of the structures in the hierarchy which directs which path is to be taken to translate an address. This path may select, e.g., instruction access only, data access only, or a shared access. One example of a hierarchical based mechanism is described in a co-filed, commonly assigned patent application Ser. No. 14/231,665 entitled "Hierarchical Translation Structures Providing Separate Translations for Instruction Fetches and Data Accesses," Michael K. Gschwind et al., which is hereby incorporated by reference herein in its entirety.

Referring to FIG. 11, in one example, patched application code 420 includes a modified portion, and that modified portion is stored in one or more memory regions 1100 of system memory 410. The unmodified portion (corresponding to the modified portion) continues to be in other memory regions 1102 of system memory 410. In particular, the other memory regions 1102 include that application code prior to modification.

In this embodiment, an effective address 600 is used to access memory region 1100 or memory region 1102 depending on whether the address translation is for an instruction fetch 608 for a modified portion or a data access 610 for an unmodified portion. If, for instance, the translation is for an instruction fetch of a modified portion, then effective address 600 is translated to physical address 604*a*, which points to memory region 1100 that includes the modified code. However, if the address translation is for a data access, then effective address 600 is translated to physical address 604*b*, which points to memory region 1102, which includes the unmodified, pre-existing or original code that corresponds to the modified code.

Figure 12:
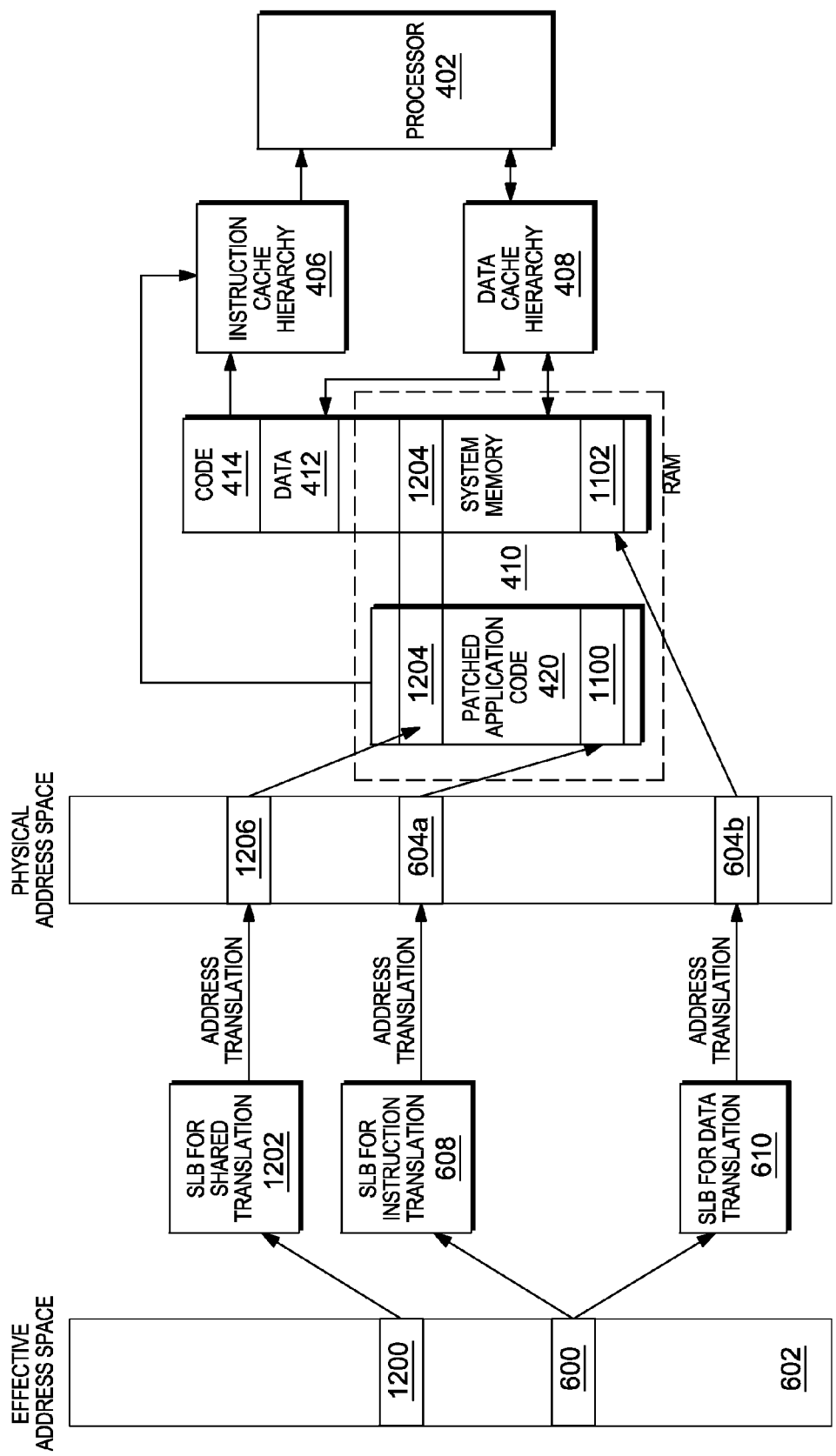
FIG. 12 depicts examples of translating effective addresses to physical addresses.

In a further embodiment, with reference to FIG. 12, an effective address 1200 may use a shared translation 1202, in which a same memory region 1204 is used for an instruction fetch and a data access (since, for instance, that code portion has not been modified). In this example, effective address 1200 is translated to a physical address 1206, which points to memory region 1204.

Figure 13:
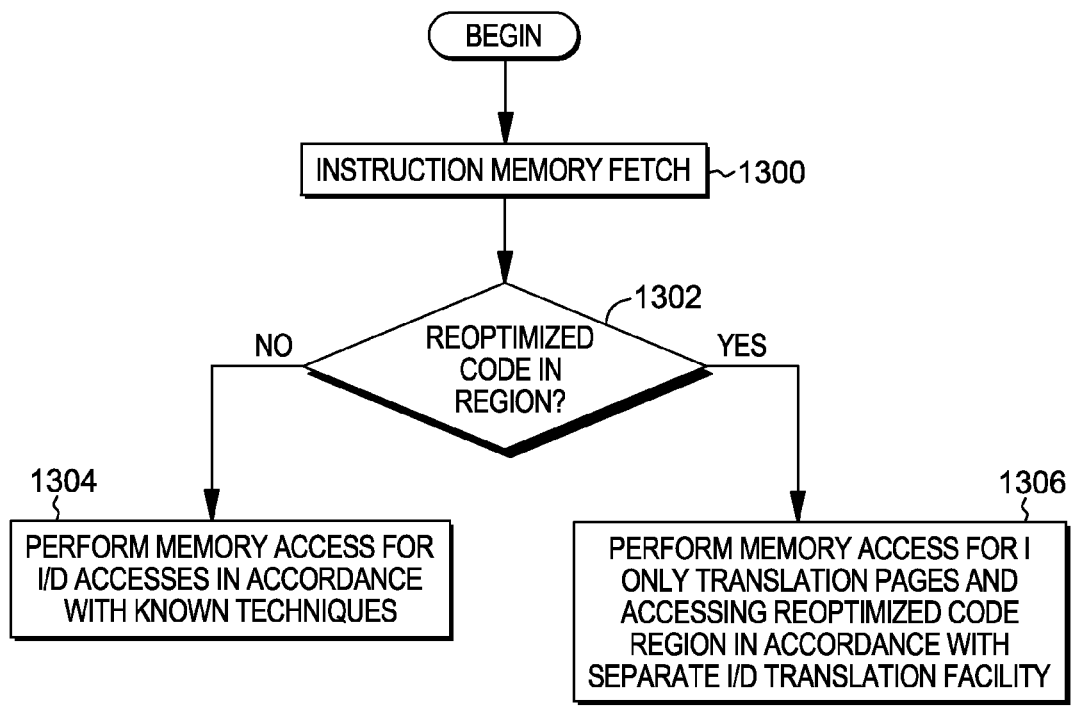
FIG. 13 depicts one example of logic to perform an instruction fetch.

One embodiment of logic used for an instruction fetch, in accordance with one aspect, is described with reference to FIG. 13. Initially, when an optimizer creates modified code, it configures or has configured address translation structures to use separate instruction page(s) to access the modified instruction sequence; however, for code regions that have not been modified, the address translation structures are configured to use the same page(s) to satisfy both instruction and data access. Thus, when there is an instruction fetch, STEP 1300, a determination is made based, e.g., on whether the fetch is from patched code or original code, as to whether optimized code is being accessed, INQUIRY 1302.

If the code region associated with the instruction fetch has not been modified, INQUIRY 1302, then the translation is performed using known address translation techniques, such as those described above without the NOA indication, STEP 1304. However, if the code region has been modified, INQUIRY 1302, then translation is performed using separate I/D translation, as described above in one example that uses NOA described in, for example, FIGS. 7-10, STEP 1306.

One example of a code structure with original code that is to be optimized is indicated below:

```
#define MAX 1024
float a[MAX][MAX], b[MAX][MAX], c[MAX][MAX];
main( )
{
        int i, j, k;
        init( );
        foo( );
        for (i=0; 9<MAX;i++)
                for(j+0; j<MAX;j++){
                        float sum = 0;
                        for (k=0;1<MAX;k++)
                                sum+=a[i][k]*b[k][j];
                        c[i][j]=sum;
                }
        bar( );
        exit(-1);
}
```

The compiled code that includes this code structure is for instance:

```
.L.main:        mflr 0
                std 31, -8(1)
                std 0, 16(1)
                stdu 1, -128(1)
                bl init
                nop
                bl foo
                nop
                ld 4, .LC2@toc(2)
                li 3,0
                ld 0, .LC5@toc(2)
                ld 31, .LC6@toc(2)
                addi 6, 4, 4092
                neg 12, 4
                subf 0, 4, 0
.L2:
                sldi 7, 3, 12
                addi 7, 7, -4
                add 7, 4, 7
                add, 5, 21, 12
.L6:
                ld 11, .LC8@toc(2)
                li 9, 0
                lfs 0, 0(11)
                li 11, 1024
                mtctr 11
.L3:
                sldi 11, 9, 10
                add 8, 0, 6
                add 10, 5, 7
                lfsx 12, 8, 9
                lfsx 13, 10, 11
                addi 9, 9, 4
                fmadds 0, 12, 13, 0
                bdnz .L3
                stfsu 0, 0(7)
                cmpd 7, 6, 7
                bne+ 7, .L6
                addi 3, 3, 1
```

```
    cmpwi 7, 3, 1024
    addi 6, 6, 4096
    extsw 3, 3
    addi 12, 12, −4096
    bne+ 7, .L2
    bl bar
    nop
    li 3, −1
    bl exit
    nop
```

It is identified, in one example, by, for instance, an optimizer, such as DCO, that the following is a hotspot in the code to be optimized:
sldi 11, 9, 10
add 8, 0, 6
add 10, 5, 7
lfsx 12, 8, 9
lfsx 13, 10, 11
addi 9, 9, 4
fmadds 0, 12, 13, 0
bdnz, .L3,
which is equivalent to, for instance:
for (k=0; k<MAX; k++)
sum+=a[i][k]*b[k][j].

This code is re-optimized, in one example, by performing an unroll twice, which produces, for instance:

```
            lfs 0, 0(11)
            lfs 20, 0(11)
            li 11, 1513
            mtcr 11
.L3opt:
            sldi 11, 9, 10
            add 8, 0, 6
            add 10, 5, 7
            lfsx 12, 8, 9
            add 8, 0, 6
            lfsx 13, 10, 11
            add 10, 5, 7
            lfsx 22, 8, 9
            lfsx 23, 10, 11
            addi 9, 9, 8
            fmadds 0, 12, 13, 0
            fmadds 20, 12, 13, 0
            bdnz .L3opt
            fadds 0, 0, 20
```

Figure 14:
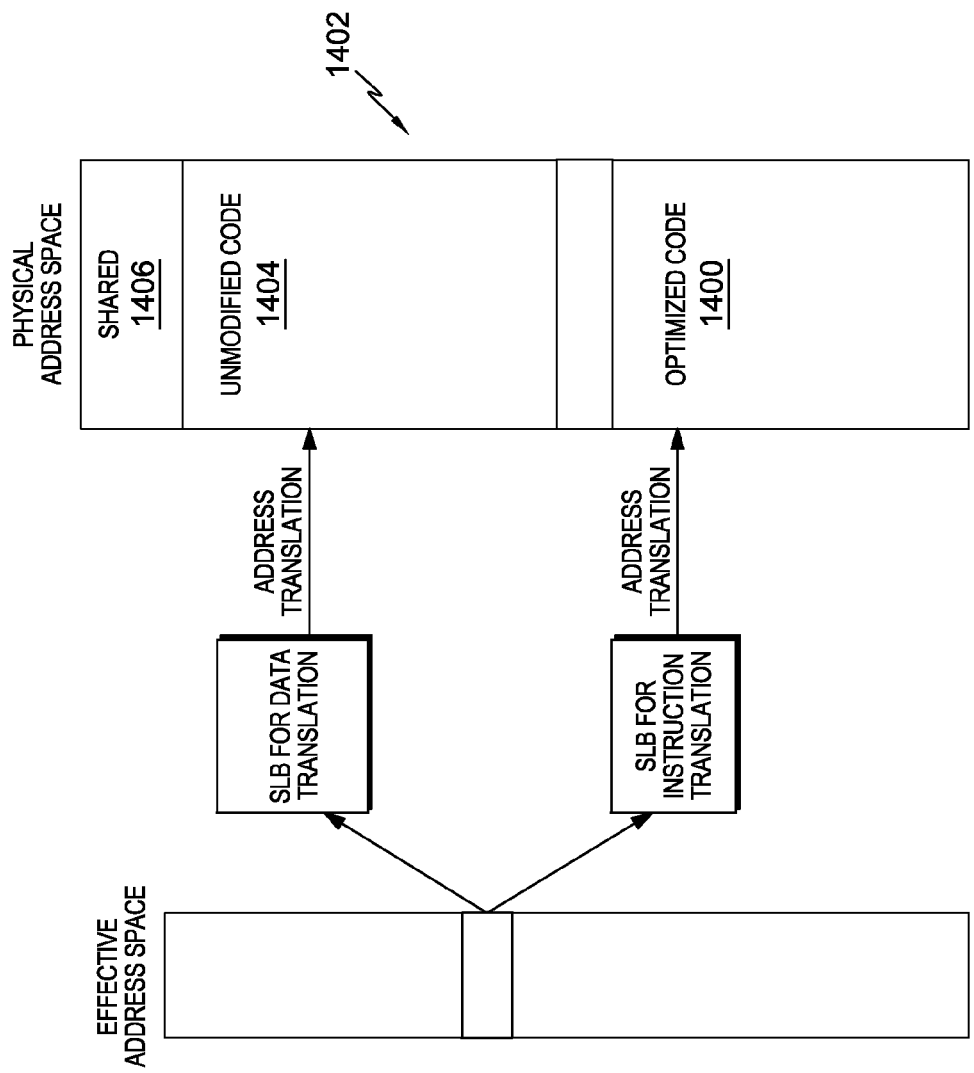
FIG. 14 depicts one example of an address space with separate memory regions for unmodified code and modified code.

The optimized code is stored, as shown in FIG. 14, in one or more memory regions 1400 of a physical address space 1402 (e.g., a process address space). Memory regions 1400 are separate from one or more memory regions 1404 of address space 1402 that include the original, pre-existing or unmodified code corresponding to the modified code. These memory regions are used for data accesses. The physical address space may also have one or more memory regions 1406 that are shared by instruction fetches and data accesses for code portions that have not been copied or modified (i.e., no other copy of the code), as an example. In particular, in one example, only modified code is duplicated, while other unmodified code is stored unmodified and used to satisfy both instruction and self-referential data references of the application. Thus, the unmodified code is in one or more first memory regions (which may include, e.g., memory regions 1404 and 1406), and the modified or copied code is in one or more second memory regions, which are separate from the one or more first memory regions. This avoids the cost of duplicating such pages in terms of retranslation codes and memory consumption.

Figure 15:
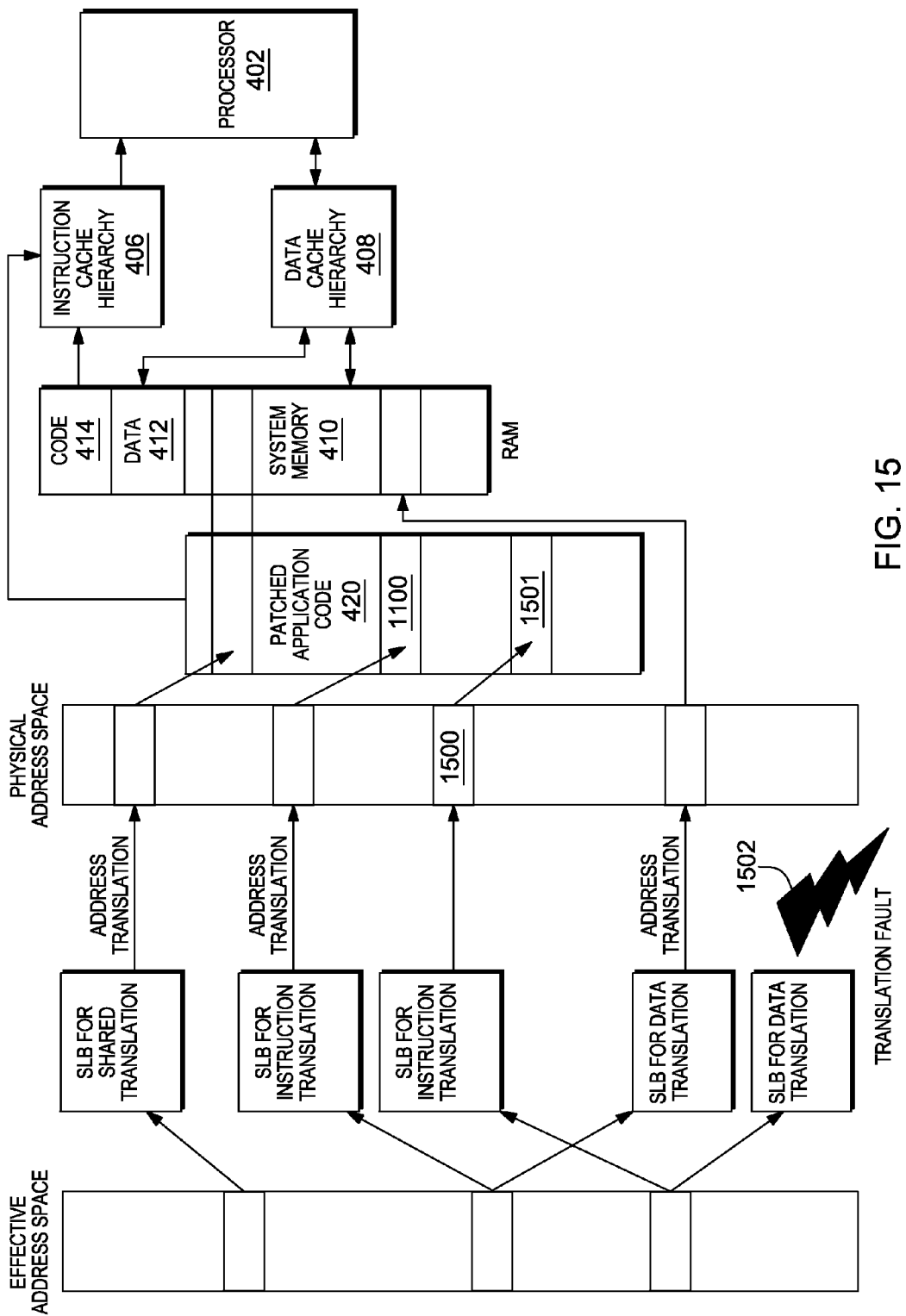
FIG. 15 depicts one example of expanding memory for instruction fetches but not for data accesses.

In addition to the above, in a further aspect, separate instruction and data translation affords the ability to hide additional instruction text that is inserted into the address space. For instance, as depicted in FIG. 15, a translation for an instruction fetch might retrieve a physical memory address 1500 used to fetch instruction text from memory region 1501, but a translation for a data access might result in a page fault 1502, giving the impression that no additional code has been inserted. This is particularly useful, for instance, if the optimized code expands beyond the code of the original binary. Thus, in one embodiment, the code with the unrolled loop (e.g., code indicated with .L3opt above) is stored in a new memory region 1501 and activated by branches from memory region 1100.

In accordance with at least one such embodiment, the code at 1100 contains the original code and activates the optimized code hot spot with a single branch, thereby preserving the correct execution of any as of yet undiscovered code entry into the non-optimized loop:

```
.L.main:    mflr 0
            std 31, −8(1)
            std 0, 16(1)
            stdu 1, −128(1)
            bl init
            nop
            bl foo
            nop
            ld 4, .LC2@toc(2)
            li 3, 0
            ld 0, .LC5@toc(2)
            ld31, .LC6@toc(2)
            addi 6, 4, 4092
            neg 12, 4
            subf 0, 4, 0
.L2:
            sldi 7, 3, 12
            addi 7, 7, −4
            add 7, 4, 7
            add 5, 21, 12
.L6:
            ld 11, .LC8@toc(2)
            li 9, 0
            lfs 0, 0(11)
            l1 11, 1024
            mtctr 11
.L3:
            JMP optimized_hotspot1 ;; was : sldi 11, 9, 10
            add 8, 0, 6
            add 10, 5, 7
            lfsx 12, 8, 9
            lfsx 13, 10, 11
            addi 9, 9, 4
            fmadds 0, 12, 13, 0
            bdnz .L3
            stfsu 0, 4(7) ;; .L3+32: optimized code returns here
            cmpd 7, 6, 7
            bne+ 7, .L6
            addi 3, 3, 1
            cmpwi 7, 3, 1024
            addi 6, 6, 4096
            extsw 3, 3
            addi 12, 12, −4096
            bne+ 8, .L2
            bl bar
            nop
            li 3, −1
            bl exit
            nop
```

Code for the optimized hotspot is the stored in section 1501 as follows:

```
optimized_hotspot 1:
            lfs 0, 0(11)
            lfs 20, 0(11)
            li 11, 1513
            mtcr 11
.L3:
            sldi 11, 9, 10
            add 8, 0, 6
            add 10, 5, 7
            lfsx 12, 8, 9
            add 8, 0, 6
            lfsx 13, 10, 11
            add 10, 5, 7
            lfsx 22, 8, 9
            lfsx 23, 10, 11
            addi 9, 9, 8
            fmadds 0, 12, 13, 0
            fmadds 20, 12, 13, 0
            bdnz .L3
            fadds 0, 0, 20
            JMP .L3+32 ;; return to unmodified code
```

Additionally, in one embodiment, the separate address translations enable the overlay of unrelated instruction and data code.

As described herein, in one aspect, separate I/D translation enables one effective address to be translated and ultimately point to two physical memory locations, one accessed for instruction fetch and one accessed for data accesses. However, from the standpoint of the optimizer any access to the code, modified or unmodified, is considered a data access, and thus, the optimizer is directed away from the modified or optimized code. If, however, such access to the modified or optimized code is to be provided, and in particular, to enable creation of the optimized code, a mapping capability is used that enables another effective address, from the optimizer, to point to the same physical location as the instruction fetch issued by the application. This is described in further detail herein.

The optimizer may either execute in the same address space as the patched application or in a separate address space. When executing in a separate address space, the optimizer (also referred to as an optimizer application) is to have access to the application binary in order to, e.g., read the program to be optimized, and/or to write-update the program with optimized code. In one embodiment, the dynamic optimizer includes an operating system interface to change page mappings of the application being optimized. For instance, a page is replicated into separate data and instruction pages, and the mapping sets up appropriate translations via, e.g., SLBs and HPTs, obtains handles to application pages, and maps application's pages into the optimizer's space. In one embodiment, the operating system also provides an interface to ensure that the application does not obtain information from the operating system about such translation changes occurring, e.g., by querying memory map and other operating system interfaces. Thus, in at least one embodiment, information about separate mapping of instruction and data pages may not be provided to applications. In at least one embodiment, optimized memory pages may not be reported as part of the application size, CPU resources used by a dynamic optimizer or other code modification component may not be reported as time incurred by the application, and so forth.

In one embodiment, one optimizer application may also concurrently optimize multiple applications, and may have pages from multiple applications mapped. Pages can be shared in the mapping (i.e., mapped for data and instruction access), or have data access only (since the expectation is that an optimizer would have no need to execute the optimized application's instructions). In one embodiment in which the optimizer executes in a separate address space, the optimizer is self-contained, and does not have to co-exist with the optimized application. There is less disruption of the optimized application (e.g., extra threads for the optimizer, extra data and instruction pages mapped, etc.). Further details regarding use of separate address spaces for the application and optimizer are described with reference to FIG. 16. In another embodiment, the optimizer application executes as part of a system service, e.g., as part of supervisor software, including but not limited to, one of an operating system, a hypervisor, or firmware.

Figure 16:
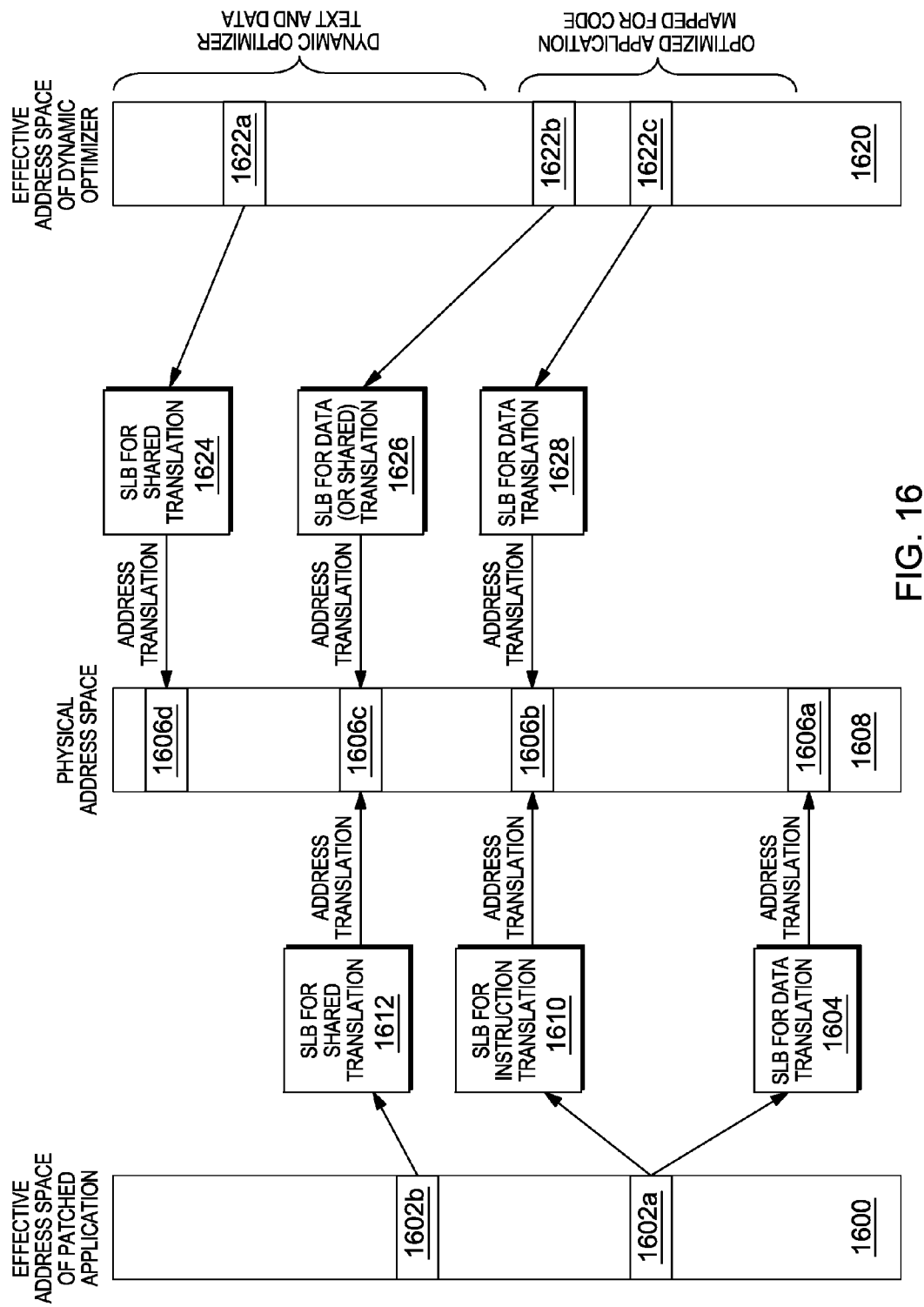
FIG. 16 depicts one example of translating effective addresses of an optimizer to physical addresses.

Referring to FIG. 16, in one embodiment, the patched application code has an effective address space 1600 having a plurality of effective addresses. An effective address 1602a is subject to separate instruction/data (I/D) translation due to, e.g., code modification, and therefore, for a data translation 1604, effective address 1602a is translated to a physical address 1606a in a physical address space 1608 (using, e.g., an SLBE for data access only); and for an instruction translation 1610, effective address 1602a is translated to a physical address 1606b in physical address space 1608 (using, e.g., an SLBE for instruction access only).

Further, an effective address 1602b of effective address space 1600 is not subject to separate I/D translation since it represents code that has not been copied or modified, and therefore, it is translated to a physical address 1606c of physical address space 1608 using a shared translation 1612 (e.g., using same SLBE regardless of whether the access is an instruction fetch or data access).

Additionally, in this embodiment, an optimizer, such as a dynamic optimizer, is executing in a separate address space 1620 from the address space 1600 in which the application is running. The optimizer may be running as part of an operating system or hypervisor or as a separate application, as examples, and thus, would be running in a corresponding address space.

The dynamic optimizer includes, for instance, its text and data located in one or more memory regions 1622a, and is mapped for code located in one or more memory regions 1622b, 1622c. In particular, in one example, effective address 1622a is translated via a shared translation 1624 to an address 1606d in physical address space 1608 that includes text and/or data of the optimizer. Further, an effective address 1622b is translated via a data or shared translation 1626 to physical address 1606c to access code of the patched application that has not been modified or copied; and an effective address 1622c is translated to physical address 1606b via a data translation 1628 to access the modified code. Thus, in this example, two separate effective addresses are translated using different translation attributes (instruction fetch and data) to access the same physical memory location.

In a further embodiment, the optimizer may be part of the same address space as the patched application code. When executing in the same address space, the optimizer application still is to have access to the application binary in order to, e.g., read the program to be optimized, and/or to write-update the program with optimized code. The unmodified pages (mapped shared) can be used based on application mapping, and pages mapped for instruction only access by the application overlaying the original address are to be mapped for data access at another address/segment.

The dynamic optimizer also includes an operating system interface to change page mappings of the present application being optimized. That is, to replicate a page into separate data and instruction pages, set up appropriate translations via SLBs and HPTs, obtain handles to application pages, and to map the application's pages into the optimizer's space. In at least one embodiment, the operating system also provides an interface to ensure that the application is not to obtain information from the operating system about such translation changes occurring, e.g., by querying memory map and other operating system interfaces (hide extra threads etc.).

Access to application pages for the optimizer can use shared I/D translation, or be mapped into the address for data access only (since the expectation is that an optimizer would have no need to execute the optimized application's instructions). Further, optimizer code can be camouflaged to reduce impact on optimized application. For instance, a key may be used by the optimizer such that memory locations that include the optimizer code cannot be accessed by the application. Further details regarding use of the same address space for the application and optimizer are described with reference to FIG. 17.

Figure 17:
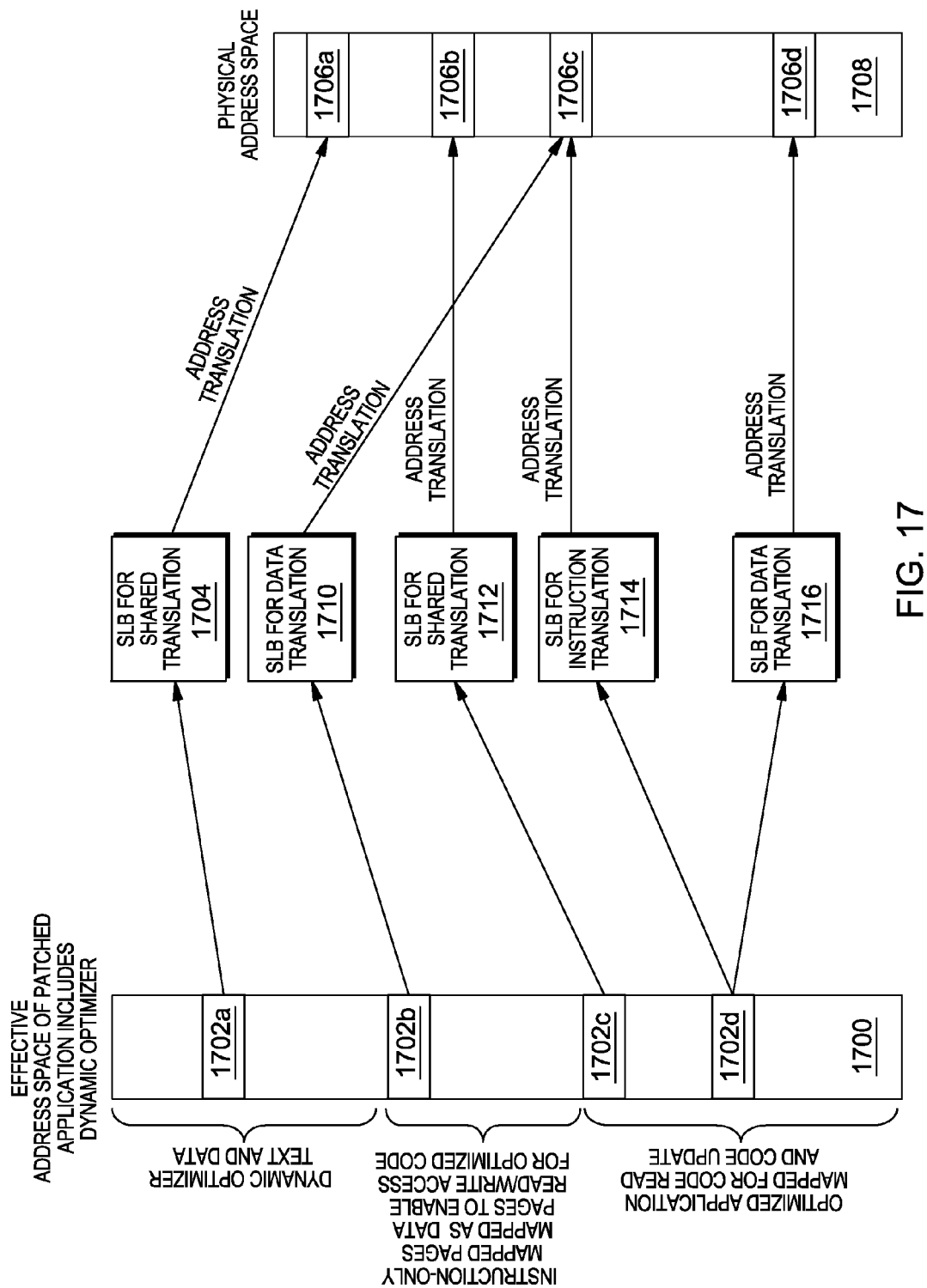
FIG. 17 depicts another example in which effective addresses of an optimizer are translated to physical addresses.

Referring to FIG. 17, one address space 1700 includes both the patched application code and the dynamic optimizer. For instance, one or more effective addresses 1702a are translated via a shared translation 1704 to one or more physical addresses 1706a of a physical address space 1708 that points to one or more physical memory locations that include text and/or data of the optimizer. Similarly, one or more effective addresses 1702b are translated via a data translation 1710 to one or more physical addresses 1706c of physical address space 1708 that point to one or more physical memory locations that include optimized code accessible by the optimizer via load and store instructions. Further, one or more effective addresses 1702c are translated via a shared translation 1712 to one or more physical addresses 1706b that point to one or more physical memory locations that include code of the patched application code that has not been copied or modified. Additionally, in this example, one or more effective addresses 1702d are translated via an instruction translation 1714 to one or more physical addresses 1706c that point to one or more physical memory locations including modified application code, and via a data translation 1716 to one or more physical addresses 1706d that point to one or more physical memory locations that include the code prior to copying/modifying used for data accesses.

In this example, physical address 1706c is obtained by translation of multiple effective addresses, one for the dynamic optimizer (address 1702b) and one for the application code (address 1702d). Thus, the optimizer accesses the code at the memory location pointed to by address 1706c via a load and store instruction and the application accesses the code at the same memory location using an instruction fetch instruction.

Figure 18:
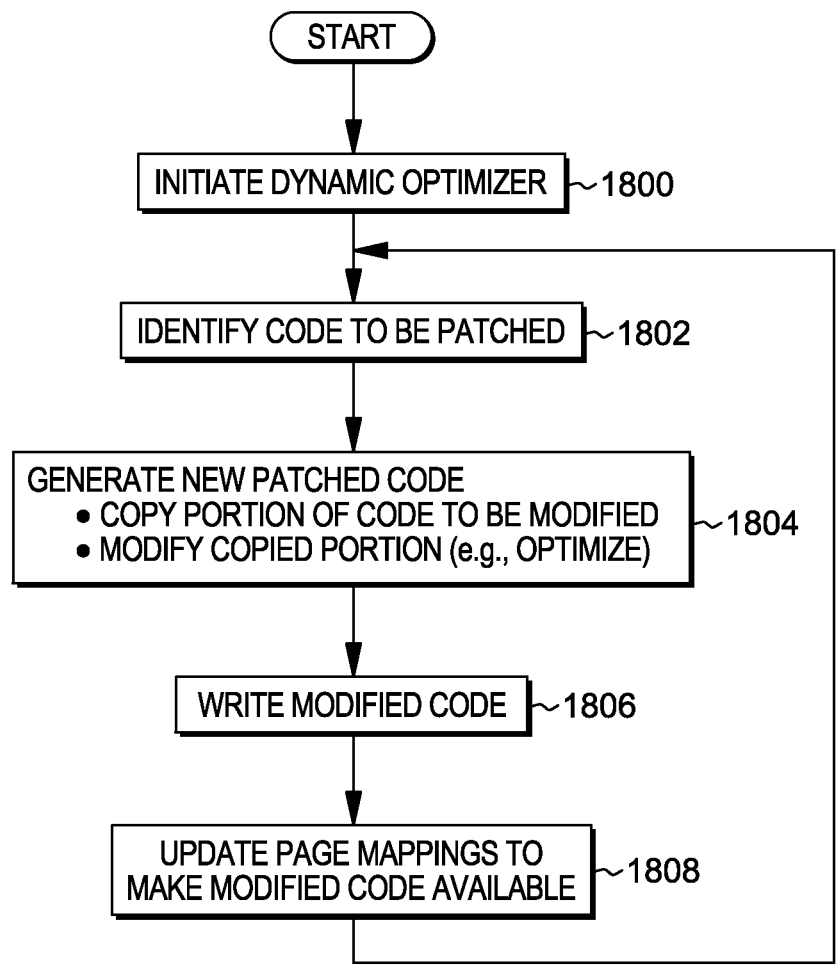
FIG. 18 depicts one example of logic to create modified code.

One embodiment of logic to create patched application code and to provide appropriate address mappings is described with reference to FIG. 18. Initially, a dynamic optimizer, such as a dynamic code optimizer, is initiated (e.g., by the operating system, application, etc., executing within a processor), STEP 1800. The optimizer identifies code to be patched, STEP 1802. For instance, the dynamic code optimizer identifies hot regions or areas in which the code may be optimized. Based on identifying the code to be modified, new code is generated, STEP 1804. In one embodiment, this includes copying the portion of the code to be modified, and then, modifying that copied portion, STEP 1804. The portion is copied, instead of copying the entire application. That is, only that portion to be modified is copied and stored in separate memory regions. The modifying may include any number of known optimization techniques, including, but not limited to, rollout.

Subsequent to generating the new modified code, that modified code is written to system memory and stored in memory locations that are different from the memory locations of the application, STEP 1806. Further, page mappings are updated to make the modified code available, STEP 1808. This includes, for instance, indicating to the one or more components of the computing environment, such as the operating system or the MMU, as examples, of where the modified code is located, and the type of access permitted for that code. For instance, the optimizer indicates that the modified code is located at physical memory regions x to x+n and should be made available at effective addresses y to y+n, and the type of access is instruction fetch only which should be used in conjunction with an existing mapping for data accesses, either by changing a currently existing shared I/D translation memory region into a separate I/D translation region and supplanting the pre-existing shared translation for addresses y to y+n by a data translation to the previously used physical memory but limited to data only accesses in conjunction with instruction accesses for y to y+n being directed to physical address x to x+n. In another aspect of at least one embodiment, an instruction only translation is added to a pre-existing data only translation. In one example, the optimizer is provided an interface to facilitate providing this information.

In one embodiment, based on receiving the mapping information, the processor, such as the MMU, creates SLBEs to be used to translate to the new pages under control of system software extended to initialize separate SLBE entries for instruction and data accesses in accordance with one or more aspects. For instance, the current SLBE that points to the code prior to being modified is copied and the VSID is updated to reflect the location of the new pages and the NOA is set to instruction access only. Further, the NOA in the SLBE pointing to the unmodified code is updated from shared to data access only. In particular, in one example, a new SLBE is created for instruction only access and translated to a new virtual address. Pages in the new virtual address range are initialized to the newly supplied memory region. Pages within the new memory region that are not initialized to a new instruction only page may be initialized to point to the unmodified code pages when only a portion of a memory region is modified. In one embodiment, these pages are initialized when a new virtual address range in conjunction with an instruction only SLBE is created. In another embodiment, they are initialized in a deferred manner such that when an access is performed, a page fault is indicated and initialization occurs in conjunction with servicing the page fault.

An SLBE, in this embodiment, represents a segment of memory (e.g., 256 MB), which includes many pages, e.g., 80,000 4KB pages. However in one example, the segment of memory represented by the SLBE is not populated with all of the pages at once, but instead, only those pages that were updated. The other pages are populated as they are accessed. For instance, if an instruction fetch is requested for another page of the segment, that page will be populated from its original memory location. Data accesses continue to go to the original memory locations.

Thus, in one embodiment, a record is maintained that this SLBE has this particular NOA and that only these pages have been populated. In one particular embodiment, after an initial SLBE replication step is performed, no translations are initially created, and bookkeeping is performed to record that I and D mappings should be initialized by default to exhibit the same effective to physical mapping for pages where no modification takes place. New translations for I and D pages are created on demand in response to page faults. These translations are based on the recorded default initialization, and are to point to a single copy of the page shared for I and D references, when the page has not been modified. When a page is to be modified in a manner to have separate I and D translation, the recordings to default to a common initialization of I and D space for a page that is being so modified are removed, and a separate mapping for I and D translation is recorded such that future mappings responsive to page faults for I and D pages reference separate pages corresponding to the optimized instruction code, and the code used for self-referential correctness.

In further embodiments, other tracking or bookkeeping is performed to facilitate processing. For instance, if some of the modified pages are paged out to, for instance, disk, a record is maintained that the paged-out pages were modified pages accessed by instruction only translations.

Another example of tracking is provided in which it is tracked that a page has been optimized, so that if the original code is modified, the optimized code may also be updated. For instance, the DCO component receives a notification when a write occurs to, for example, a statically loaded data page when that page has an associated dynamically generated instruction page. The DCO component is further equipped to handle dynamic code modification events to the static code by the application. The handling optionally includes invalidating and recompiling and/or re-optimizing the dynamically generated code corresponding to the modified static page.

In a further embodiment, a synchronization event may occur when new code is stored in order to update any caches. For instance, in one embodiment, a DCO component receives notification when a code synchronization event occurs or is performed when the page has an associated dynamically generated instruction page. The DCO component handles the dynamic code modification events to the static code by the application. The handling optionally includes the invalidating and recompiling and/or re-optimizing of the dynamically generated code corresponding to the modified static page. Further, in one embodiment, the notification is achieved by mapping the page read-only even when the page permission is set to read/write.

In another embodiment, an example of a code synchronization event is an instruction cache block invalidate (icbi) instruction. (In at least one embodiment, when an icbi instruction is used to indicate a code modification event in this manner, it is not necessary to perform actual cache invalidation, or translate the address that is the object of an icbi as an instruction access, as no invalidation is performed, but an icbi is rather used to notify a dynamic optimizer component of a dynamic code modification to a specified effective address.)

Figure 19A:
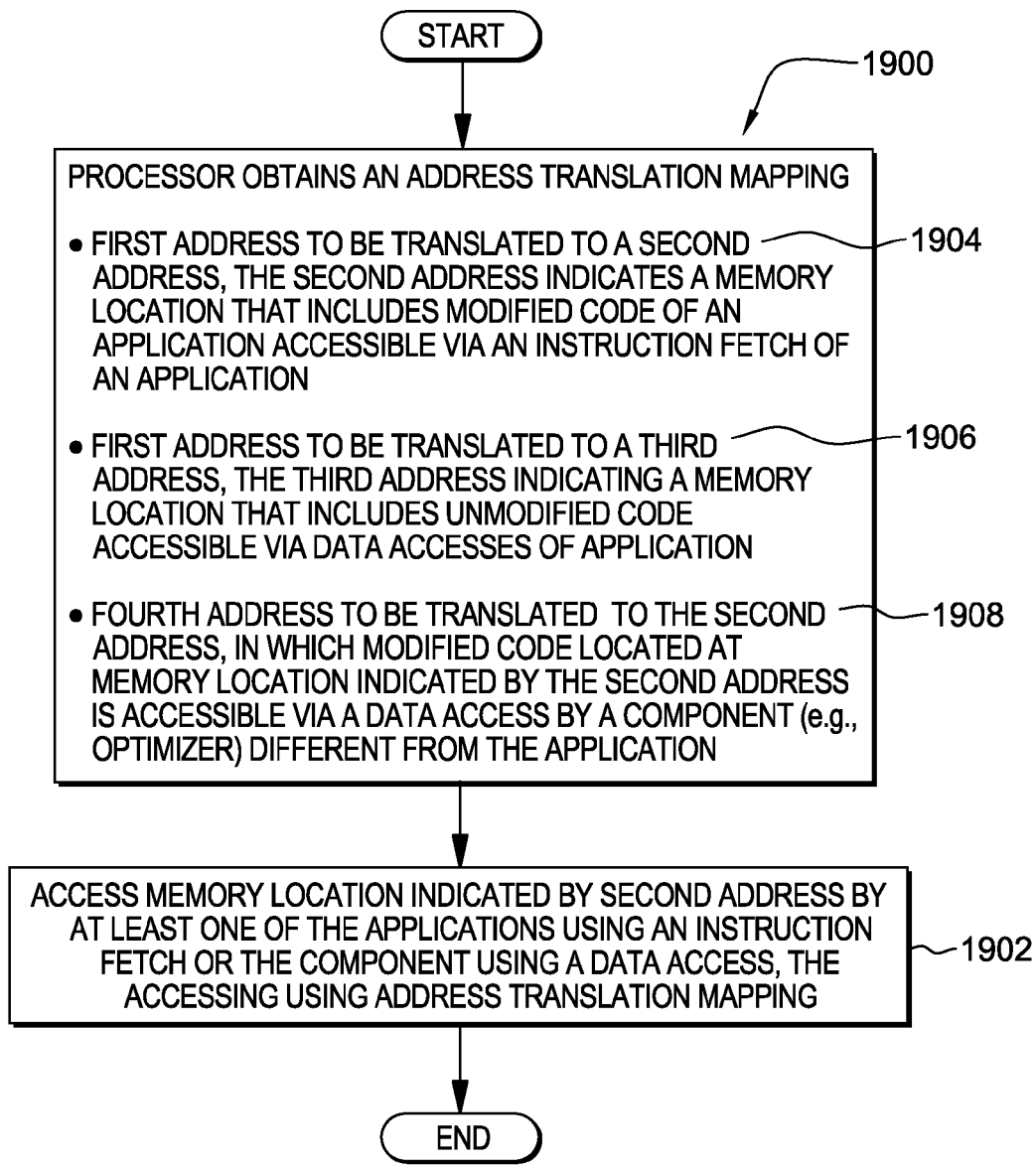
FIG. 19A depicts one embodiment of logic to obtain and use an address translation mapping.

As described herein, in one aspect, address translation mapping is used to access memory, and provide, for instance, correct execution in the wake of modifying or optimizing code. For instance, as described with reference to FIG. 19A, a processor obtains an address translation mapping, STEP 1900, and accesses memory using the mapping, STEP 1902. In one example, the address translation mapping includes, for instance: a first address to be translated to a second address, the first address being of a first type and the second address being of a second type, the second address of the second type indicating a memory location that includes modified code of an application, the modified code accessible via an instruction fetch of the application 1904; the first address to be translated to a third address, the third address being of the second type and indicating a memory location that includes unmodified code corresponding to the modified code, the unmodified code accessible via data accesses of the application 1906; and a fourth address to be translated to the second address, the fourth address being of the first type, and wherein the modified code located at the memory location indicated by the second address is accessible via a data access by a component different from the application 1908. The memory location indicated by the second address is accessed by at least one of the application using an instruction fetch or the component using a data access, the accessing including using the address translation mapping, STEP 1902.

Figure 19B:
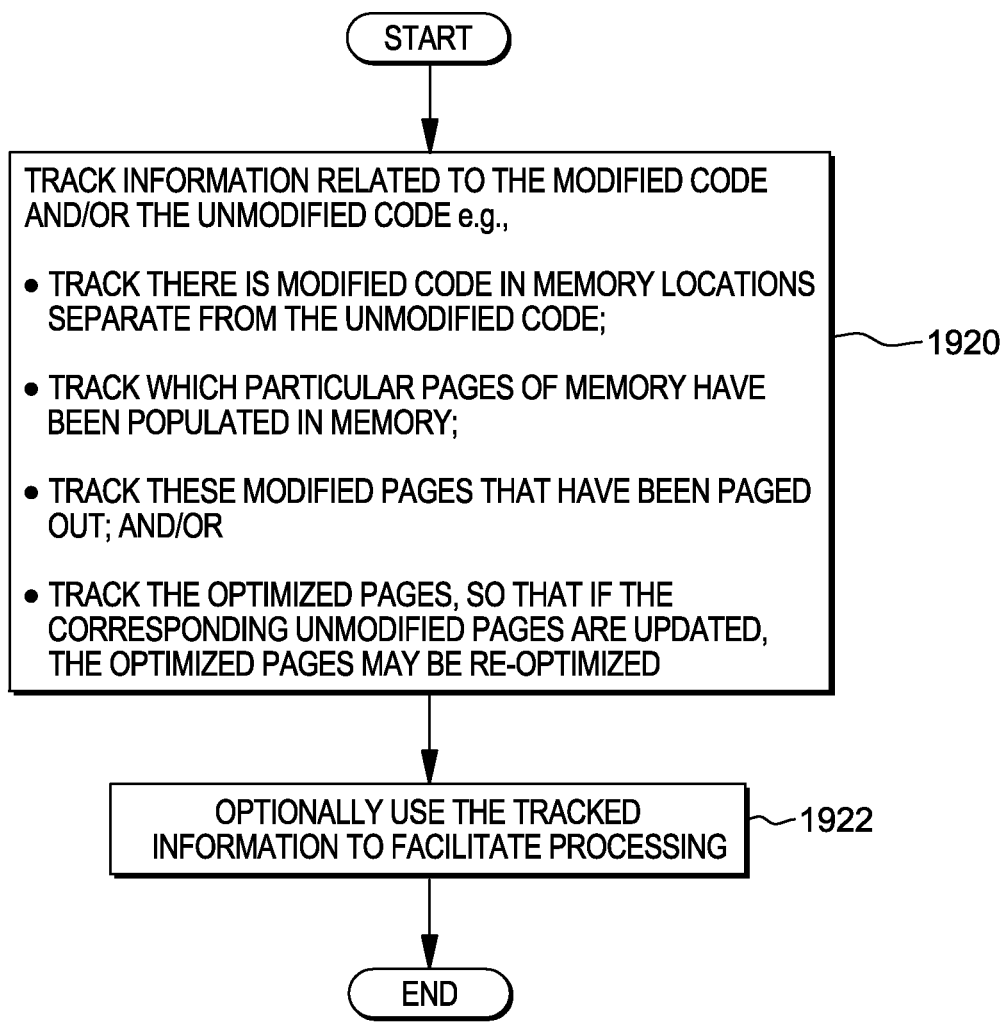
FIG. 19B depicts one example of tracking logic associated with modified and/or unmodified code.

Additionally, in one embodiment, as described with reference to FIG. 19B, information related to the modified code and/or the unmodified code may be tracked including, for instance, that there is modified code in memory locations separate from the unmodified code; which particular pages of memory have been populated in memory; the modified pages that have been paged out; and/or the optimized pages, so that if a corresponding unmodified page is updated, the optimized page may be re-optimized, as an example, STEP 1920. This tracking may be performed, for instance, by adding additional fields to existing translation structures or using other structures to maintain the desired information.

Figure 19C:
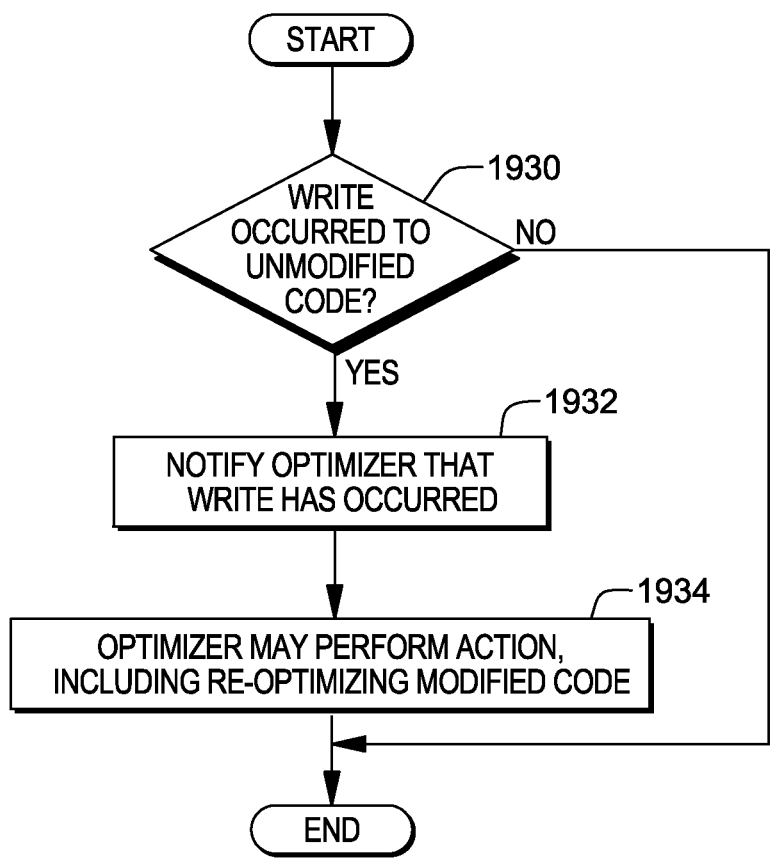
FIG. 19C depicts one example of using the tracked information of FIG. 19B.

This tracked information is optionally used to facilitate processing, STEP 1922. For instance, with reference to FIG. 19C, the processor tracks whether a write has occurred to an unmodified page corresponding to a modified page, INQUIRY 1930. If such a write has occurred, in one embodiment, the optimizer (or component) is notified by, for instance, the processor, STEP 1932, and the optimizer may perform an action, such as re-optimizing the modified code, STEP 1934. Other examples also exist.

As described above, an ability is provided to reuse existing binary code such that only code that is actually a candidate for optimization or modification is to be translated and stored. The code modification is transparently performed such that a binary only sees the original code and does not fail in the presence of self-referential code when code has changed, and consequently read accesses to code deliver expected results. The application code is transparently changed such that the modified application is unaware of a modification having occurred, however correct execution of the code is preserved. This is used, for instance, for a dynamic optimizer to re-optimize code at runtime based on execution statistics or to optimize based on an enhanced security module, an error checking module, and/or a profiling module, etc.

In accordance with one aspect, only a portion of the code is copied and modified instead of the entire code. Thus, in accordance with one aspect, the existing binary remains unchanged and those portions that are to be modified are copied and then modified, instead of direct code modification which may be problematic for self-referential code, as an example. Therefore, in accordance with one aspect, a technique is provided to transparently patch code while maintaining correct execution in the presence of self-referential behavior, i.e., preserving the appearance that code has not been modified. In accordance with one aspect, code which is to be patched is to be replaced by new code. In one example, the above is accomplished by redirecting code translation into a first area of memory and data accesses into a second area of memory. In accordance with an aspect, this is achieved by providing separate translations for pages where the base code has been changed in conjunction with hardware support for selectively managing separate instruction and data translation within a processor.

In one aspect, code is injected transparently in an application process which is not visible to an application by way of data load or store accesses, thereby preserving an application's illusion that no modifications have been performed. In such an environment, the optimizer or binary translator executes as a system component, either in a separate address space of another application process, or is part of supervisor software, such as an operating system, hypervisor, firmware or a new DCO supervisor level.

In such an application, the code re-optimization component's code and optimizer data are stored in the another application or supervisor space. Further, modifications to dynamically created code are made by way of data mappings of code pages into the application or supervisor space executing the DCO component(s) using data translations, and performing load and/or store instructions to these code regions mapped as data. Those pages are then and/or concurrently mapped into the target applicants' address space.

In another aspect, the dynamic code optimizer is resident in the applicant's address space in a region of the address space defined/selected so as to not interfere. The code pages are mapped into instruction translations at addresses overlaying the original code region. Data references to code are satisfied by the original unmodified code, and instruction fetches are satisfied from pages containing modified code. In addition, the DCO optimizer component's code is mapped to the optimized application process, as instructions and optionally data mappings, and a data region corresponding to the DCO component is mapped as data.

In one embodiment, code pages corresponding to optimized code pages of the optimized process are mapped in the process's address space using data translations corresponding to a data address not conflicting with the optimized application's instruction or data spaces. In one embodiment, this mapping occurs concurrently, i.e., the processor can execute an instruction from a page for an application, while concurrently the DCO component may be having that page mapped for writing. In one embodiment, the DCO component continues populating and/or patching the application using its distinct data mapping of the code. In another embodiment, the optimizer writes a page in its data space, and then operates with the operating system to update the address mappings, and map the data page as an instruction page to replace an existing instruction page, or provide a new page with additional optimized code entered by branches from transparently modified code. In one embodiment, when a page is mapped to instruction space, it becomes unmapped for data accesses by the DCO. In another embodiment, when a page is mapped to instruction space, it remains mapped for data accesses by the DCO. In another embodiment, when a page is mapped to instruction space, it remains mapped for data read accesses by the DCO, but becomes unmapped for write data accesses by the DCO.

In one embodiment, modifications to code that is mapped for instruction execution can be concurrently performed. In another embodiment, additions to a mapped code page containing code that is mapped for instruction execution can be concurrently performed, but existing code cannot be modified. In another embodiment, no additions or modifications to mapped code pages containing code that is mapped for instruction execution can be concurrently performed. When a code injection is to be performed to existing code (either modification or addition) where such modification is disallowed, a new page is written by the DCO component containing all code. When the new code page is complete, the pre-existing page is replaced. This occurs optionally by performing a system call to exchange the previously executing page and the new page.

In one or more embodiments, a dynamic code update technique for executing code is provided that includes executing statically loaded code and dynamically generated code. Code is executed in a first set of code pages that have been statically loaded, the code pages mapped for data and instruction access at the same address for use of the application. The application further performs instruction fetches, and optionally, self-referential accesses to this page. Further, code is executed from a dynamically generated page, when the page has been configured to satisfy an instruction fetch. Data accesses are performed to the statically loaded page corresponding to the dynamically generated page to satisfy data accesses corresponding to a DCO-unmodified static page by the application. The memory of the dynamically generated page is mapped for use by data accesses by the DCO component at another address.

In one example, the page containing the dynamically generated code is mapped for data access by the DCO component while concurrently being mapped for instruction access by the application. As examples, the DCO component and application execute in the same process and/or address space; or in different address spaces.

In a further embodiment, the page containing the dynamically generated code is mapped for data access by the DCO component while being unmapped for instruction access by the application.

In one embodiment, the DCO component adds additional instructions to a page simultaneously mapped for instruction and data access.

The DCO component, in a further aspect, generates code into a page mapped as a data page, performs a call to insert the page corresponding to an application address range, while preserving the data access to the original page.

In a further example, the DCO component receives a notification when a write occurs to a statically loaded data page when the page has an associated dynamically generated instruction page. The DCO component handles dynamic code modification events to the static code by the application. The handling optionally further includes the invalidating and recompiling and/or re-optimizing of the dynamically generated code corresponding to the modified static page.

Figure 20:
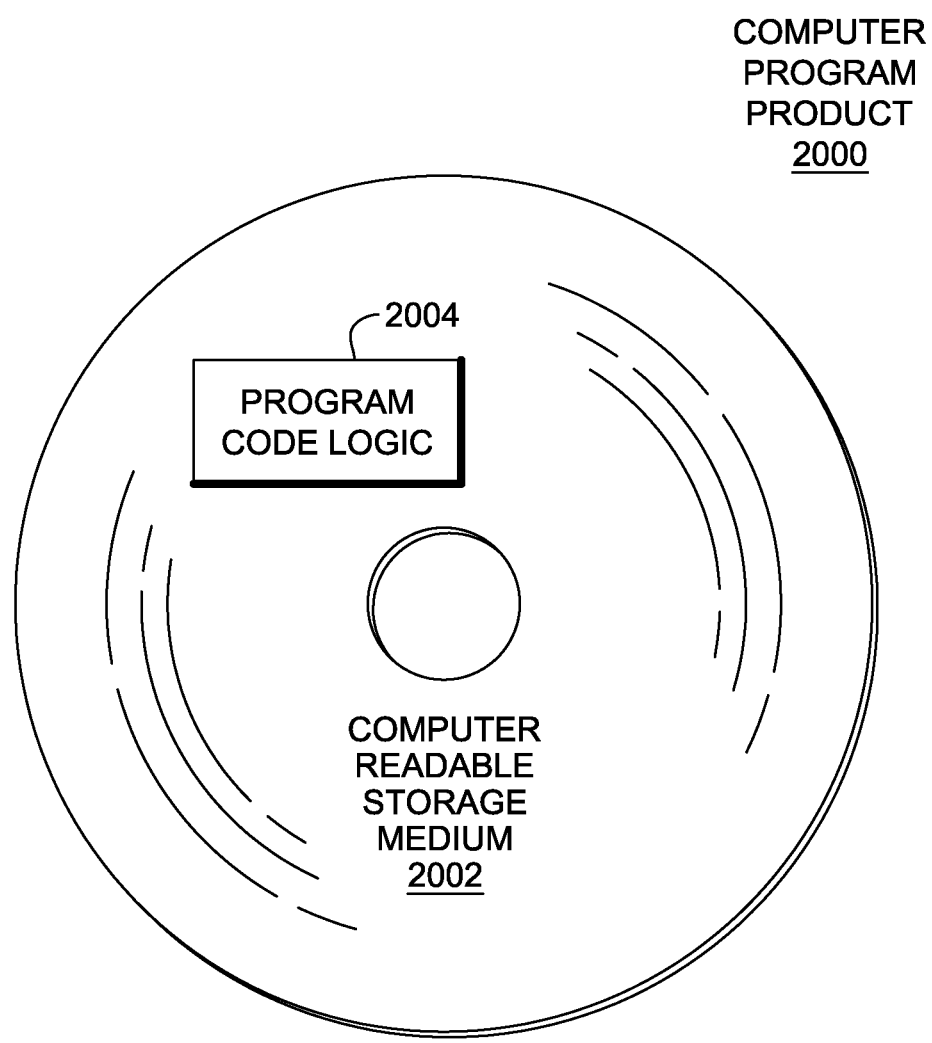
FIG. 20 depicts one embodiment of a computer program product.

Referring to FIG. 20, in one example, a computer program product 2000 includes, for instance, one or more non-transitory computer readable storage media 2002 to store computer readable program code means, logic and/or instructions 2004 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other types of address translation may benefit from one or more aspects. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 21:
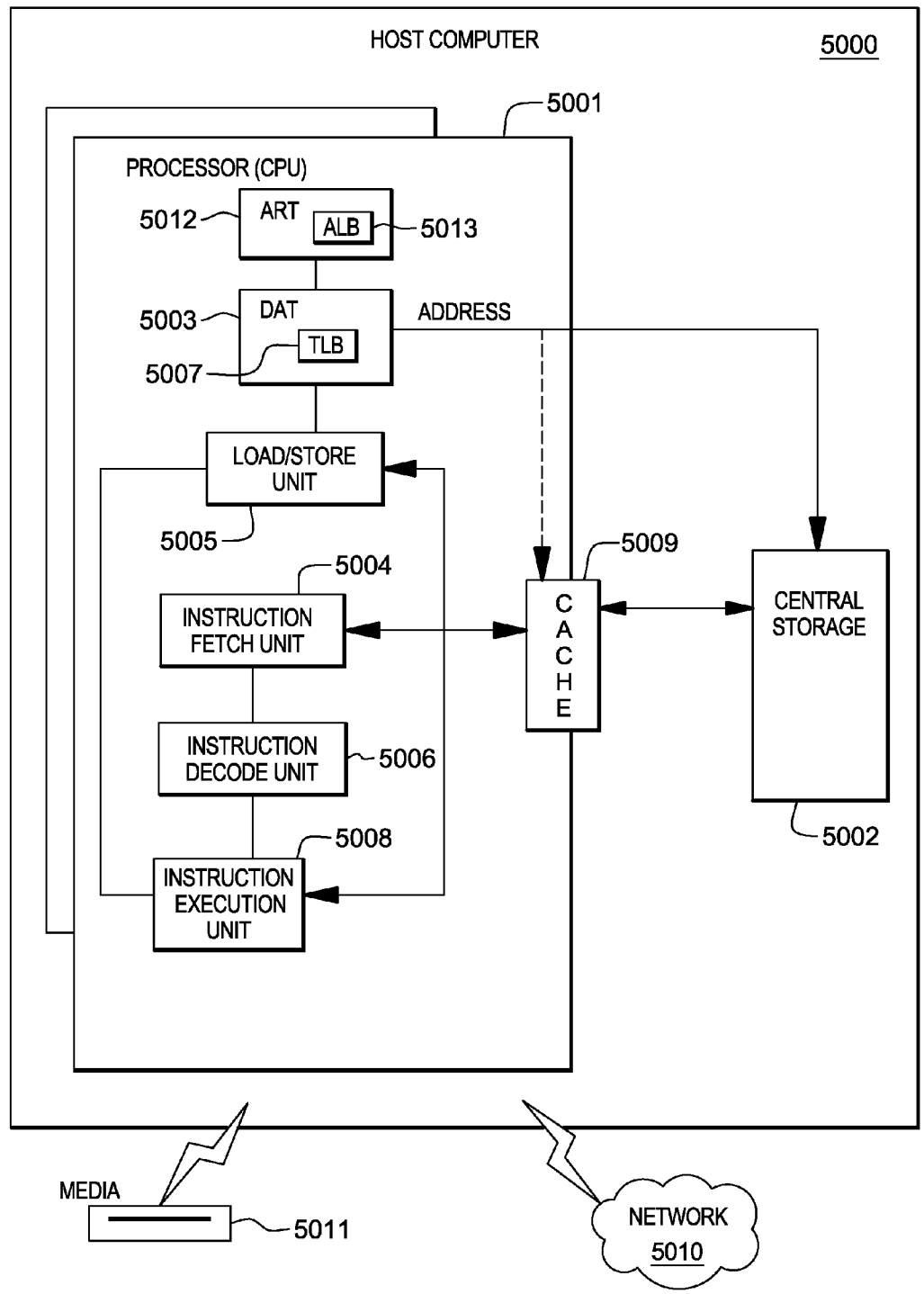
FIG. 21 depicts one embodiment of a host computer system.

Referring to FIG. 21, representative components of a Host Computer system 5000 to implement one or more embodiments are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer (ALB) 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. In another embodiment, this information may be obtained from firmware, e.g., in accordance with interfaces specified by the Power Architecture Platform Reference specification. A model may also provide one or more of data cache block touch (dcbt), PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the POWER ISA and z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the POWER ISA and z/Architecture, bits are numbered in a left-to-right sequence. In the POWER ISA and z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 21, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 22:
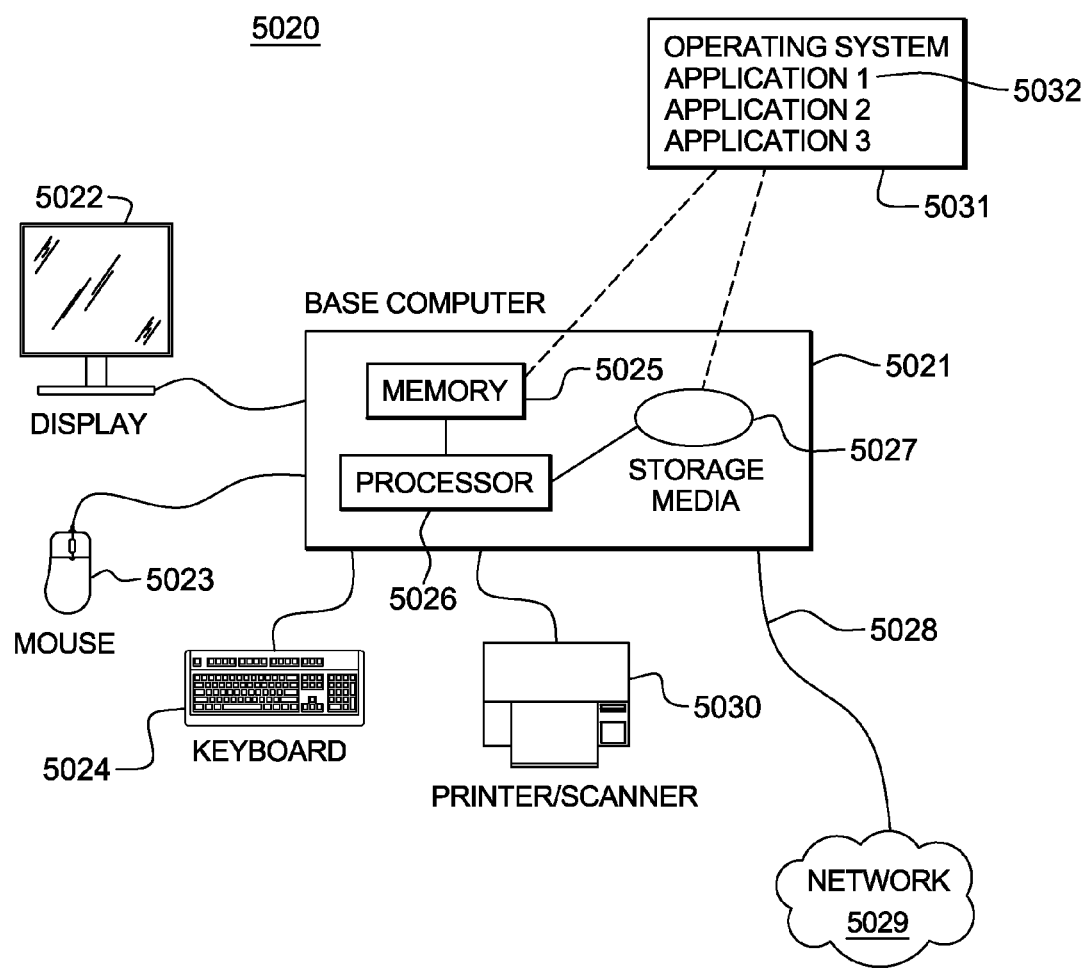
FIG. 22 depicts a further example of a computer system.

FIG. 22 illustrates a representative workstation or server hardware system in which one or more embodiments may be practiced. The system 5020 of FIG. 22 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 23:
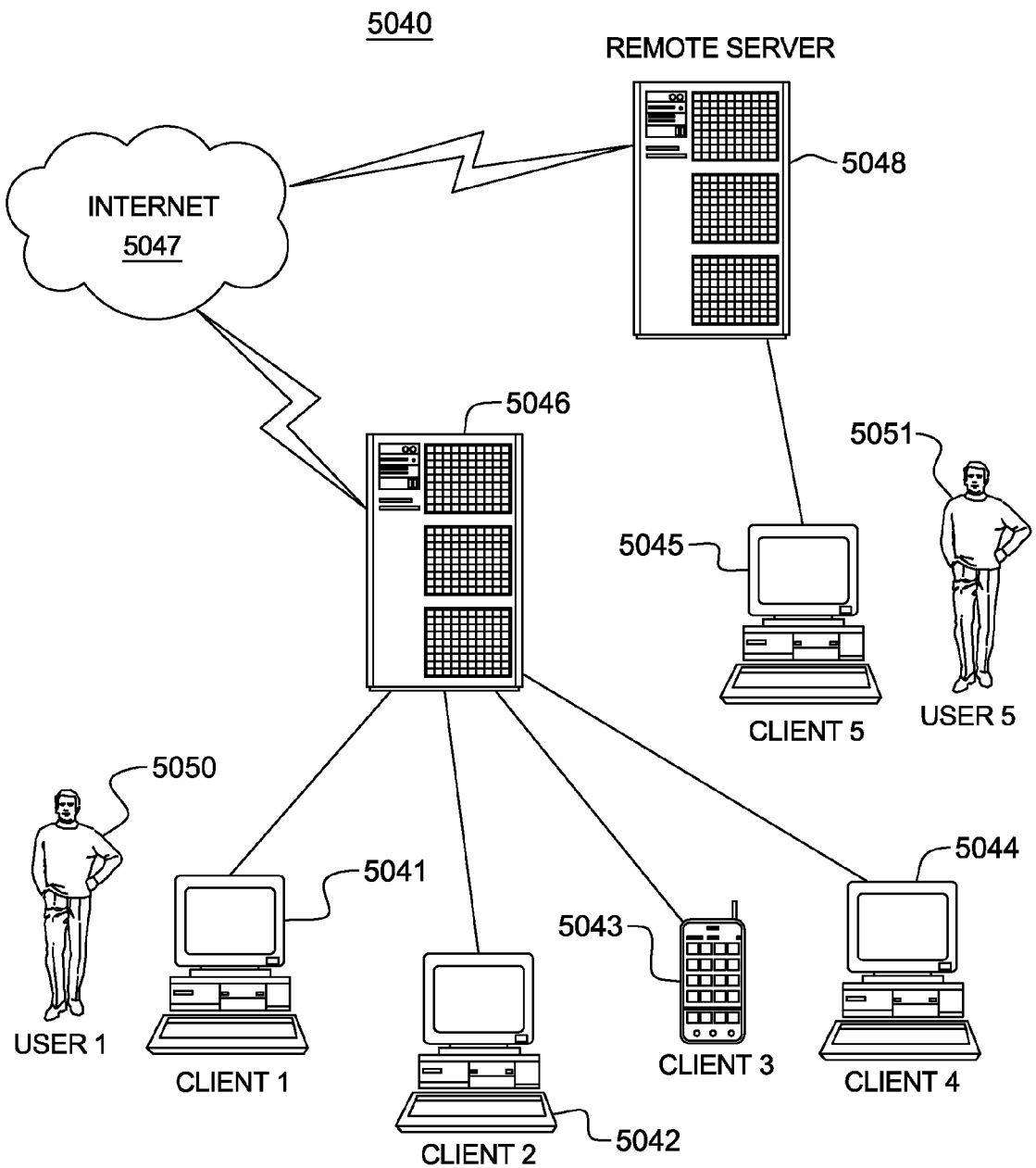
FIG. 23 depicts another example of a computer system comprising a computer network.

FIG. 23 illustrates a data processing network 5040 in which one or more embodiments may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 23, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing one of an IBM Power Systems server and an IBM System z server available from International Business Machines Corporation.

Referring concurrently to FIG. 22 and FIG. 23, software programming code 5031 which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 24:
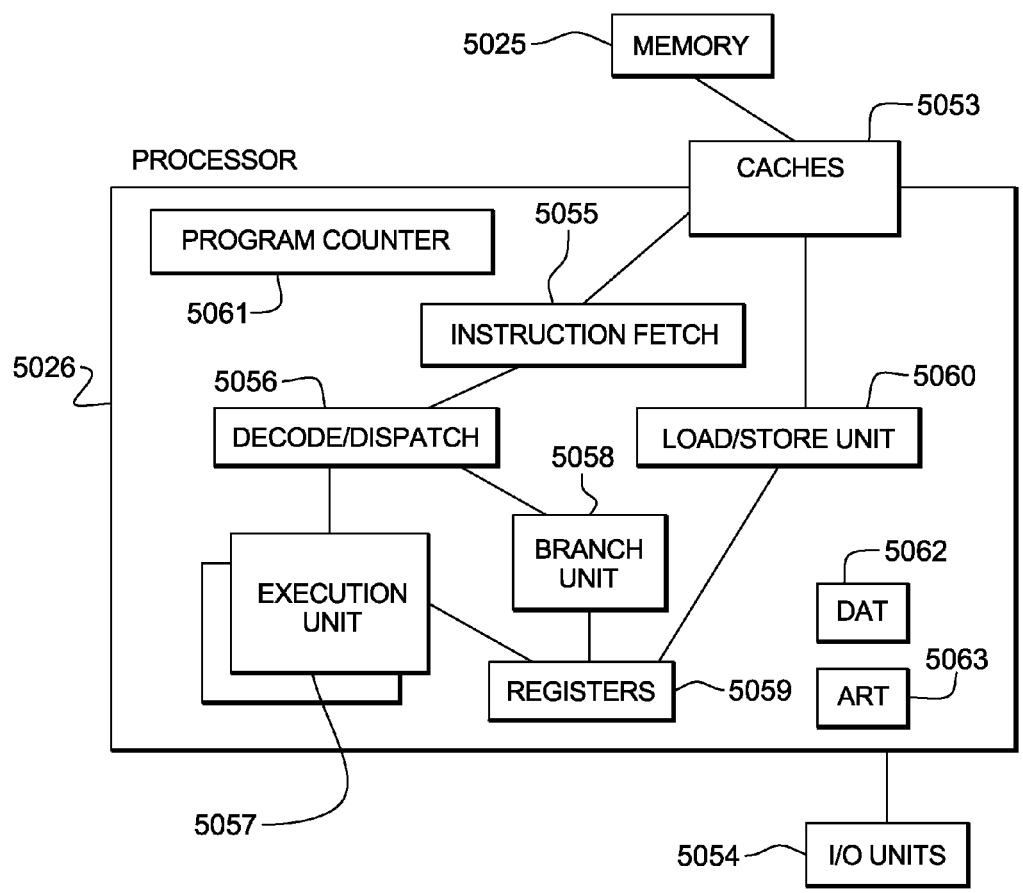
FIG. 24 depicts one embodiment of various elements of a computer system.

Referring to FIG. 24, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter in a Power Architecture processor is 64 bits and can be truncated to 32 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. Instructions of the IBM Power ISA are RISC instructions having a length of 4 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 25A:
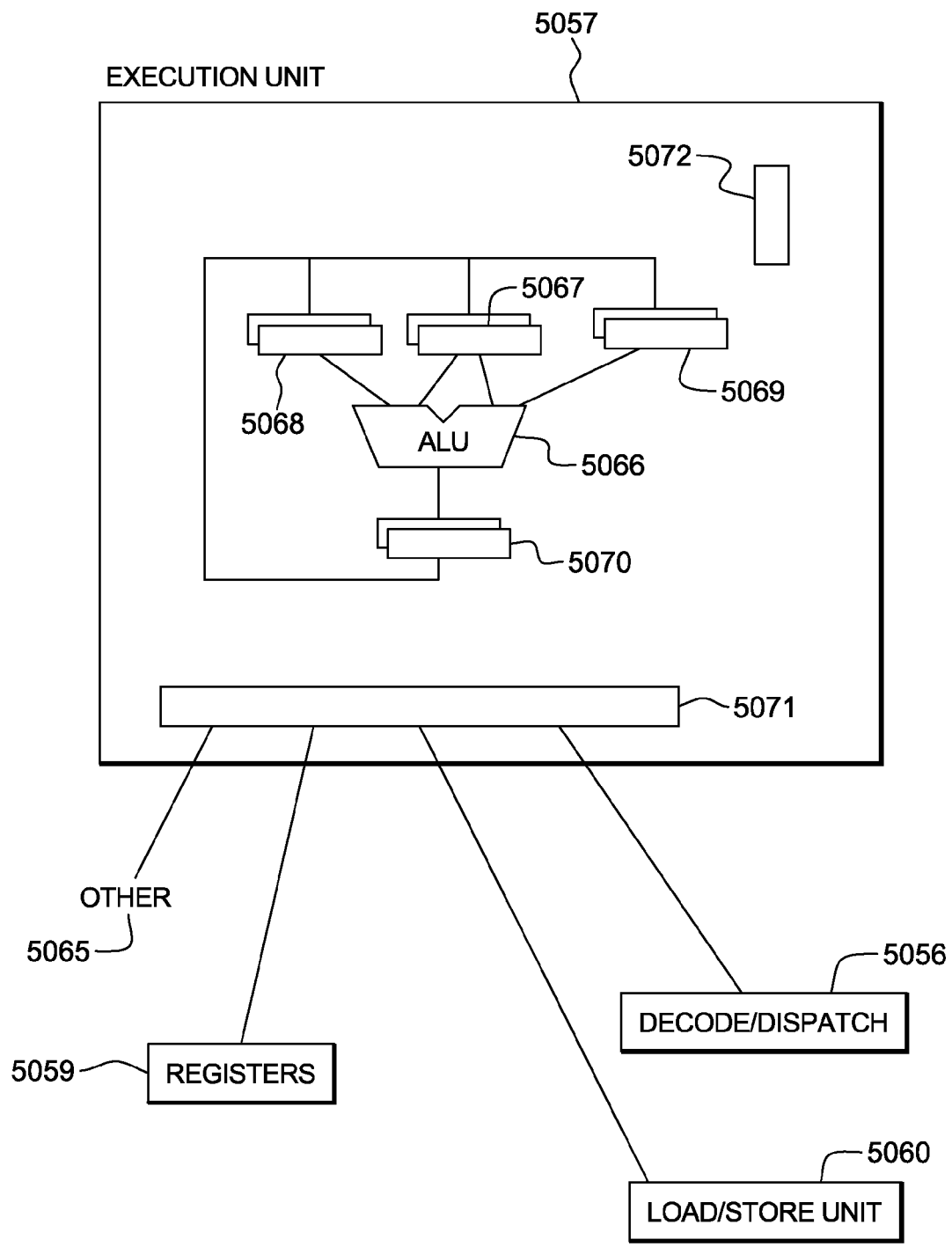
FIG. 25A depicts one embodiment of the execution unit of the computer system of FIG. 24.

A processor 5026 typically has one or more units 5057, 5058, 5060 for executing the function of the instruction. Referring to FIG. 25A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. The IBM Power ISA supports both Big Endian and Little Endian execution modes. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 25B:
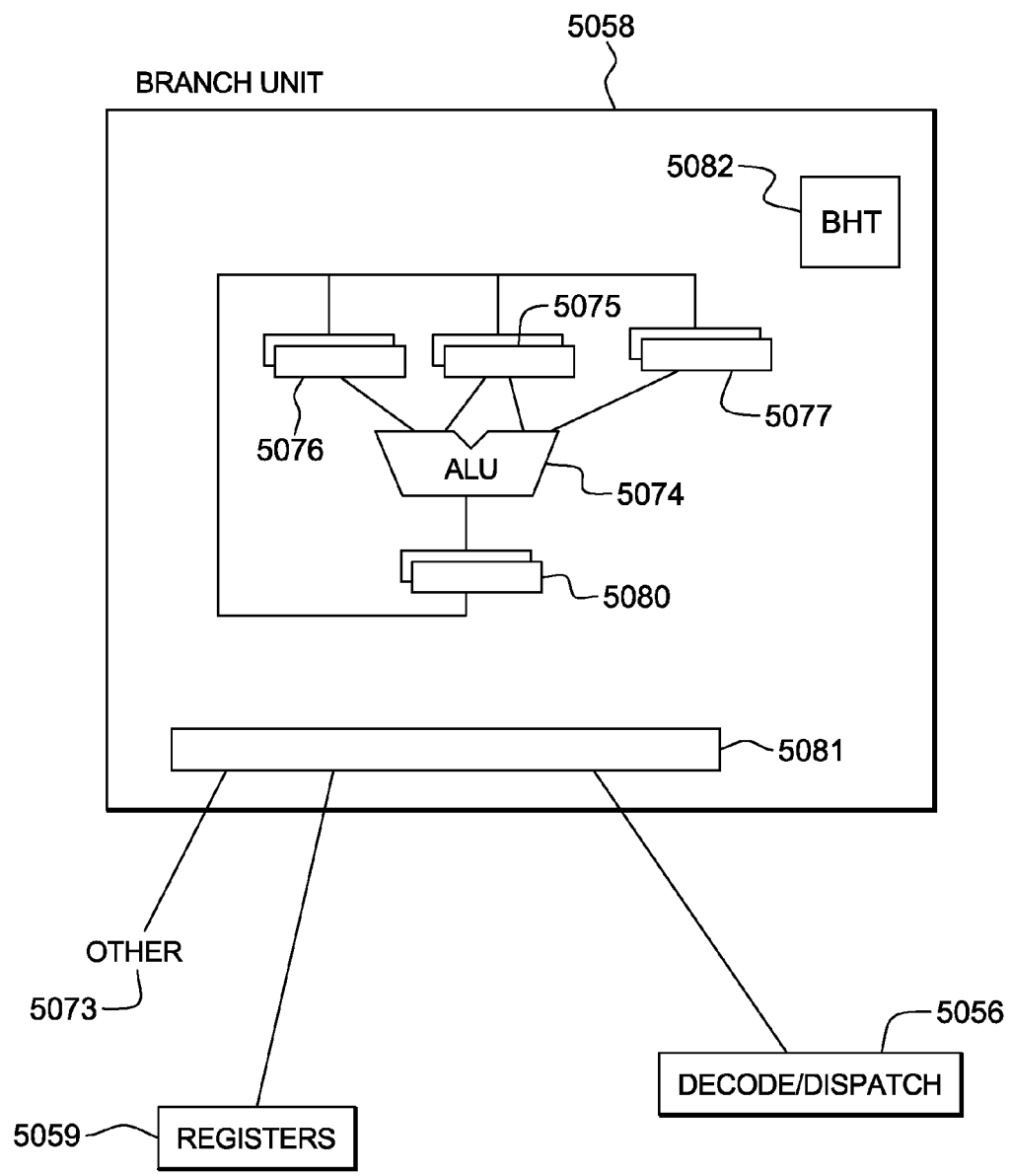
FIG. 25B depicts one embodiment of the branch unit of the computer system of FIG. 24.

Referring to FIG. 25B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example; or the Power ISA addressing modes wherein D-Form addresses define a base register and an immediate field (displacement field) that are added together to provide the address of the operand in memory; and wherein X-Form addresses define a base register and an index register that are added together to provide the address of the operand in memory. Location herein typically implies a location in main memory (main storage) unless otherwise indicated.

Figure 25C:
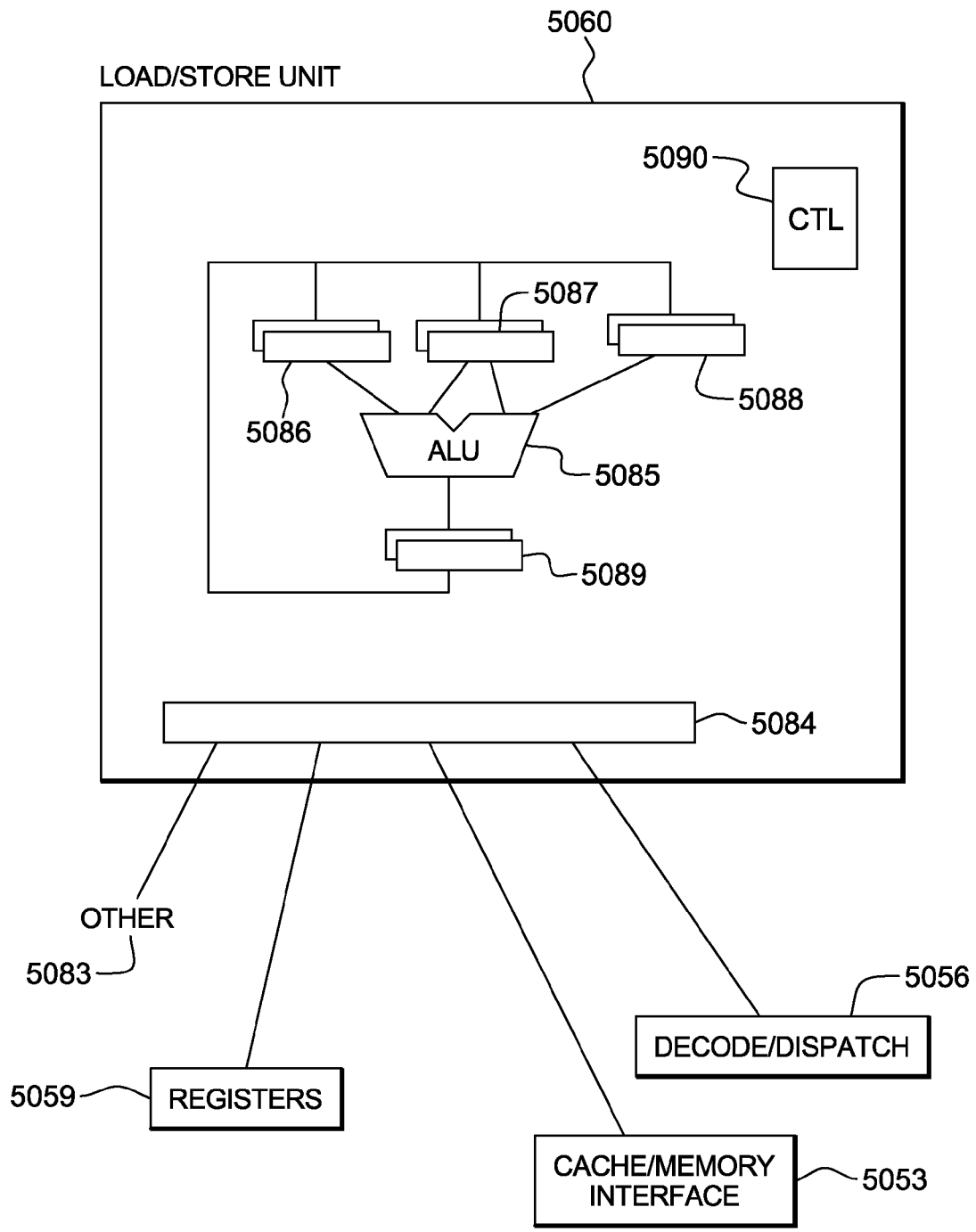
FIG. 25C depicts one embodiment of the load/store unit of the computer system of FIG. 24.

Referring to FIG. 25C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 24) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices. In RISC servers, such as Power Systems from IBM®, proprietary adapters and open system adapters are I/O units that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a Power Systems or a z/Architecture IBM® Server, or alternatively in machines executing other architectures. They can be emulated in the existing and in future IBM® mainframe servers, Power Systems servers and on other machines of IBM® (e.g., System x Servers). They can be executed in machines running Linux on a wide variety of machines using hardware manufactured by IBM®, Intel®, AMD, and others. Besides execution on that hardware under a Power Architecture or z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 26:
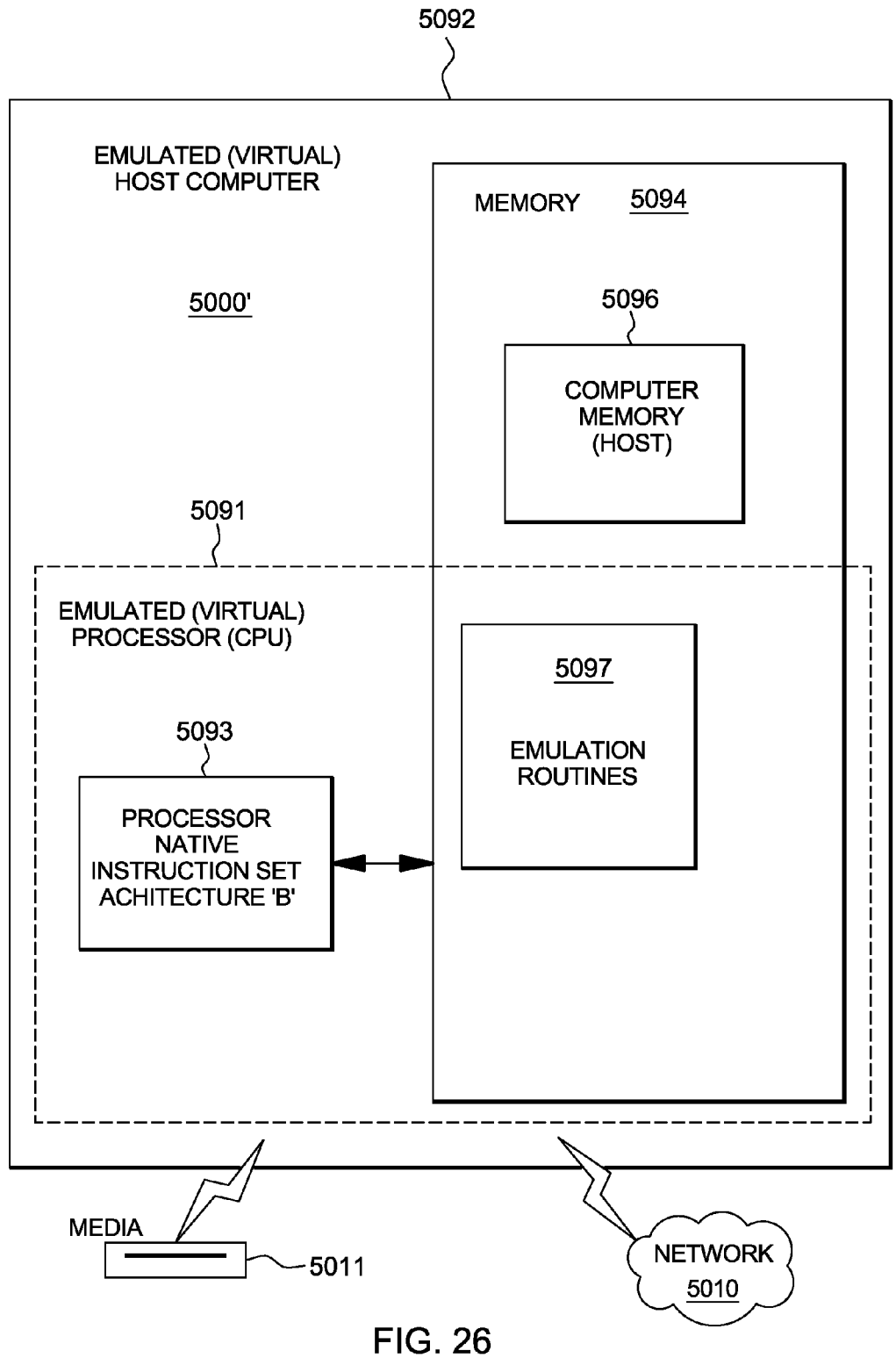
FIG. 26 depicts one embodiment of an emulated host computer system.

In FIG. 26, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 27:
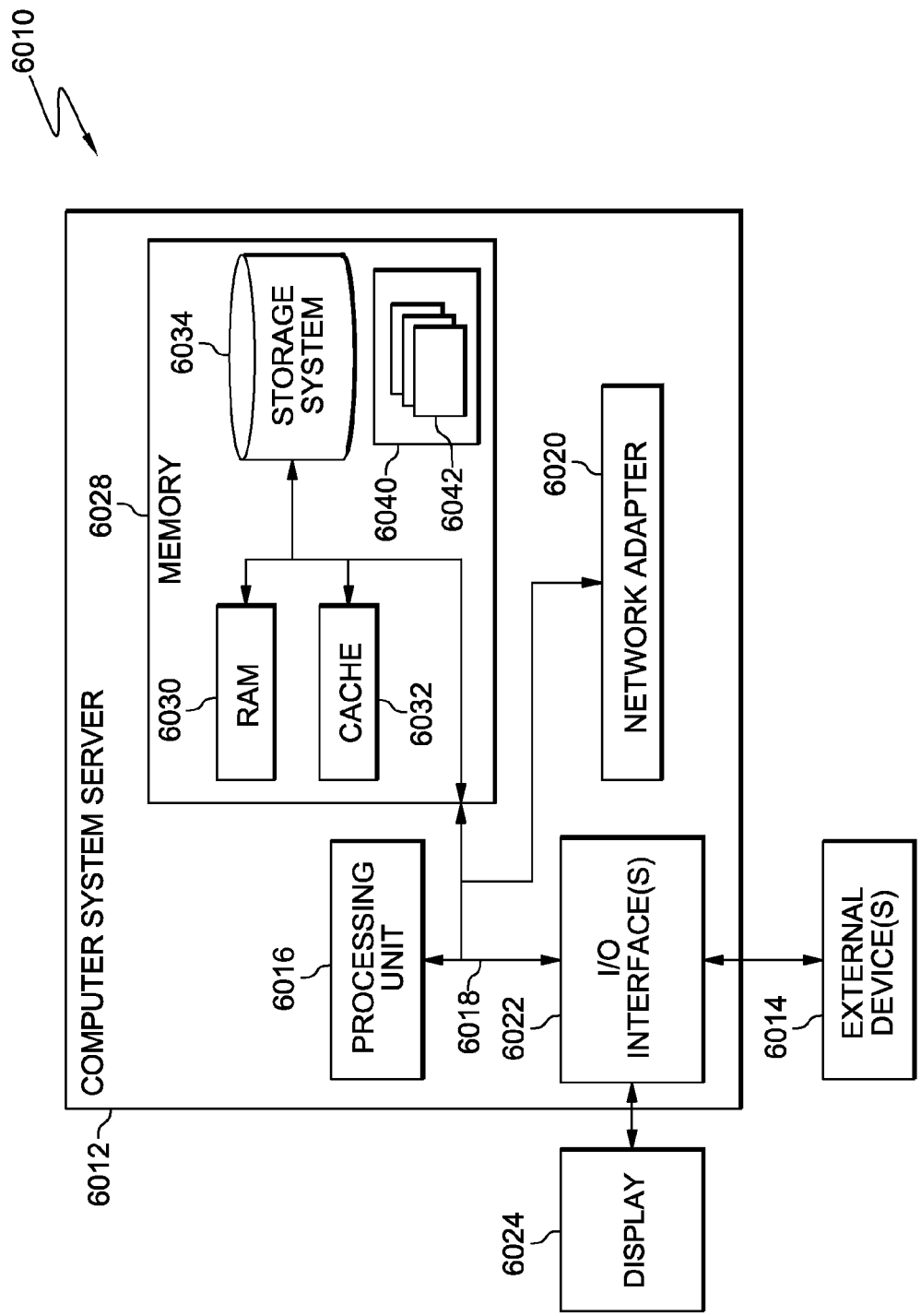
FIG. 27 depicts one embodiment of a cloud computing node.

Referring now to FIG. 27, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 27, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 28:
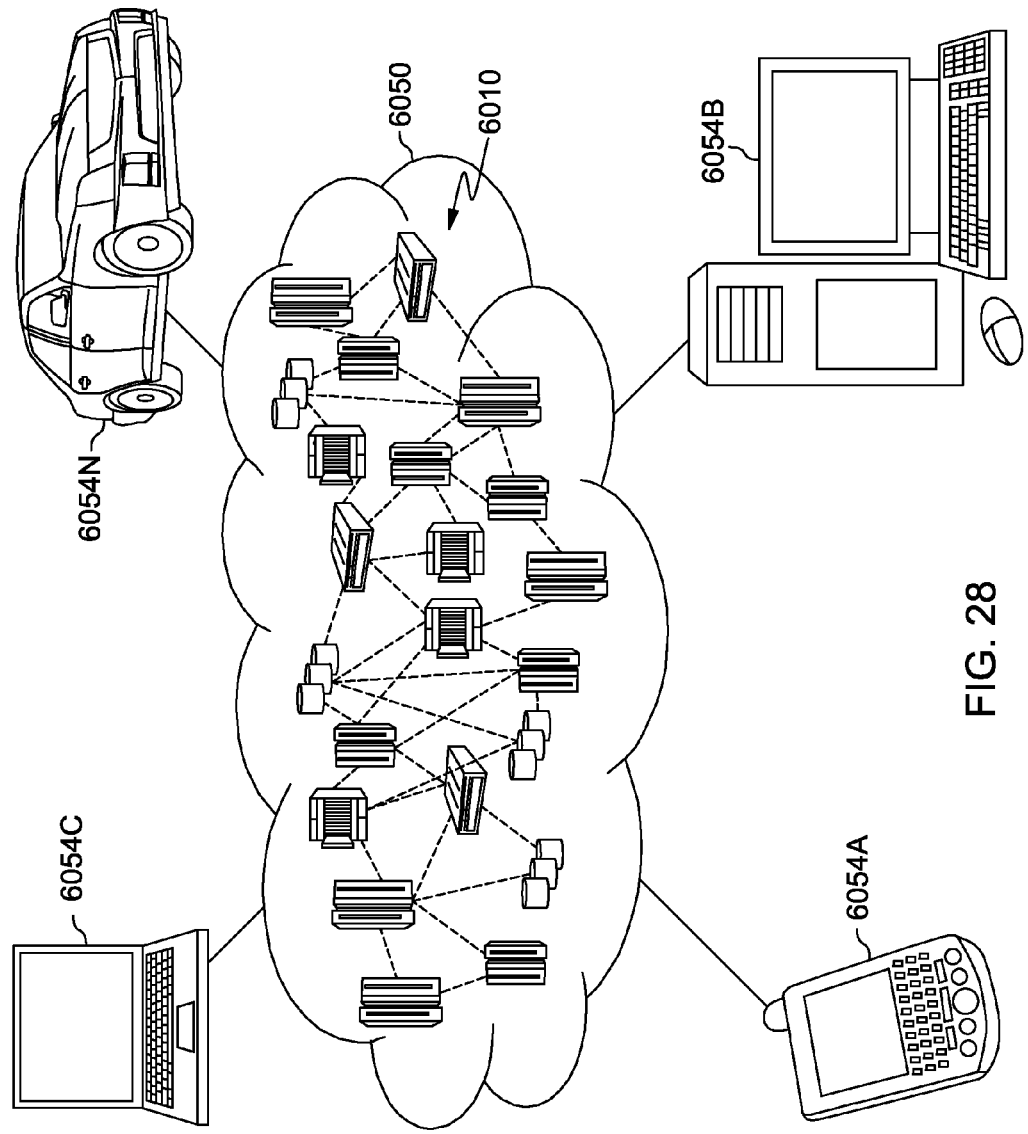
FIG. 28 depicts on embodiment of a cloud computing environment.

Referring now to FIG. 28, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 28 are intended to be illustrative only and that computing nodes 6010 and cloud computing environment 6050 can communicate with any type of computerized device over any type of network and/or network addressable connection (e.g., using a web browser).

Figure 29:
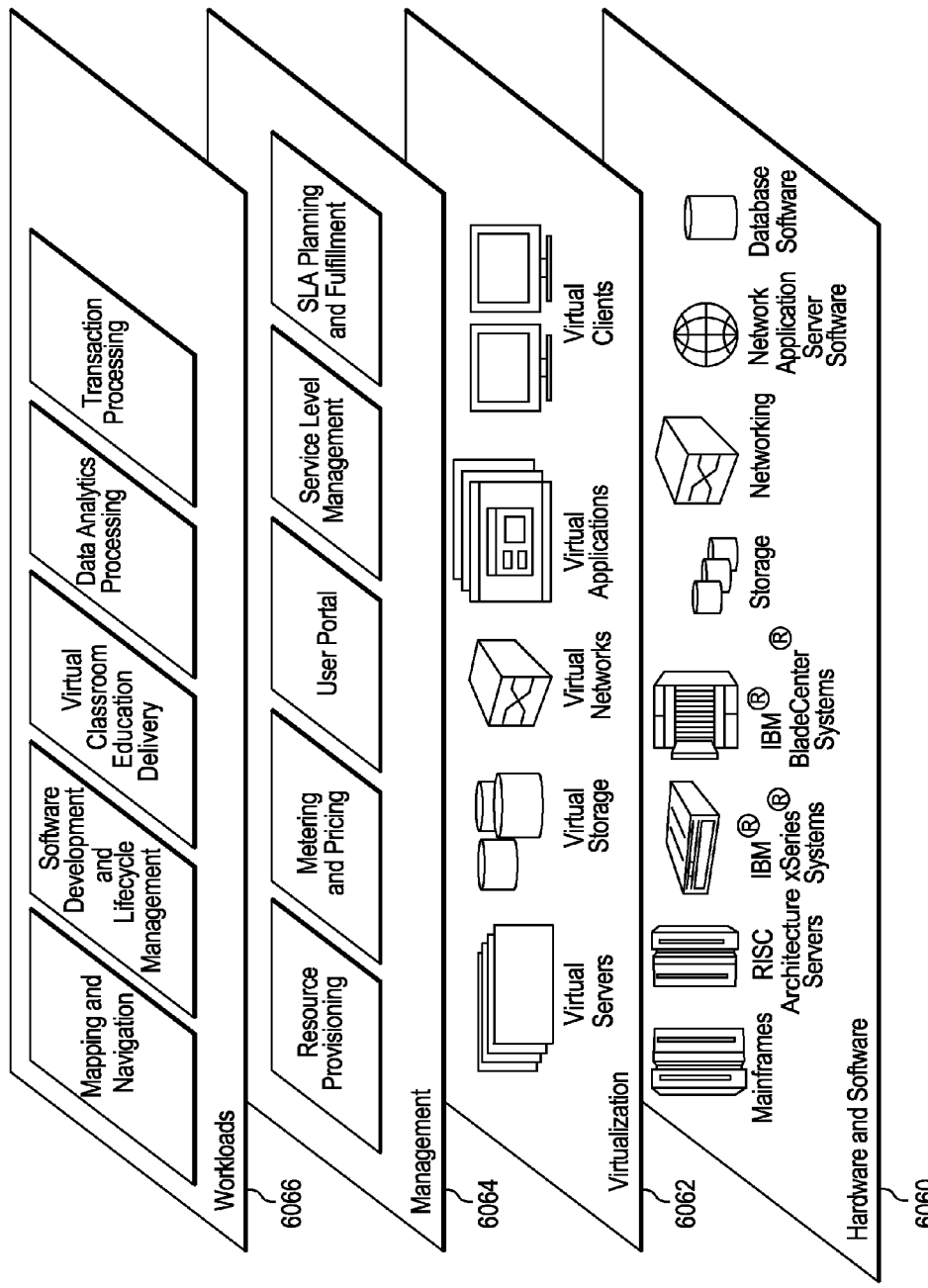
FIG. 29 depicts one example of abstraction model layers.

Referring now to FIG. 29, a set of functional abstraction layers provided by cloud computing environment 6050 (FIG. 28) is shown. It should be understood in advance that the components, layers, and functions shown in FIG. 29 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of facilitating processing within a computing environment, said method comprising:
    obtaining, by a processor, an address translation mapping, wherein the address translation mapping comprises:
        a first address to be translated to a second address, the first address being of a first type and the second address being of a second type, the second address of the second type indicating a memory location that includes modified code of an application, the modified code accessible via an instruction fetch of the application;
        the first address to be translated to a third address, the third address being of the second type and indicating a memory location that includes unmodified code corresponding to the modified code, the unmodified code accessible via data accesses of the application; and
        a fourth address to be translated to the second address, the fourth address being of the first type, and wherein the modified code located at the memory location indicated by the second address is accessible via a data access by a component different from the application; and
    accessing the memory location indicated by the second address by at least one of the application using an instruction fetch or the component using a data access, the accessing including using the address translation mapping.

2. The method of claim 1, wherein the component comprises an optimizer.

3. The method of claim 2, wherein the optimizer resides in a same address space as the application.

4. The method of claim 2, wherein the optimizer resides in a different address space than the application.

5. The method of claim 1, further comprising:
    creating, by the component, the modified code; and
    providing, by the component to the processor, at least a portion of the address translation mapping, based on the creating.

6. The method of claim 5, wherein the creating comprises:
    copying the unmodified code;
    modifying the unmodified code to provide the modified code;
    storing the modified code in memory in memory locations separate from the unmodified code; and
    updating the address translation mapping based on the storing.

7. The method of claim 6, further comprising tracking information related to one of the modified code and the unmodified code to facilitate processing.

8. The method of claim 1, further comprising tracking that there is modified code in memory locations separate from the unmodified code.

9. The method of claim 8, further comprising:
    determining that a write has occurred to the unmodified code corresponding to the modified code; and
    notifying the component that the write has occurred to the unmodified code corresponding to the modified code.

10. The method of claim 9, further comprising re-optimizing the modified code based on the write to the unmodified code.

* * * * *